(12) United States Patent
Nagai et al.

(10) Patent No.: US 12,465,908 B2
(45) Date of Patent: Nov. 11, 2025

(54) EXHAUST GAS PURIFICATION CATALYST

(71) Applicant: MITSUI MINING & SMELTING CO., LTD., Tokyo (JP)

(72) Inventors: Yusuke Nagai, Saitama (JP); Shingo Akita, Saitama (JP); Hiroki Kurihara, Saitama (JP); Yoshinori Endo, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 529 days.

(21) Appl. No.: 17/785,996

(22) PCT Filed: Dec. 17, 2020

(86) PCT No.: PCT/JP2020/047108
§ 371 (c)(1),
(2) Date: Jun. 16, 2022

(87) PCT Pub. No.: WO2021/125256
PCT Pub. Date: Jun. 24, 2021

(65) Prior Publication Data
US 2023/0029275 A1    Jan. 26, 2023

(30) Foreign Application Priority Data
Dec. 18, 2019   (JP) .................................. 2019-228405

(51) Int. Cl.
*B01J 21/04*     (2006.01)
*B01D 53/94*     (2006.01)
(Continued)

(52) U.S. Cl.
CPC .......... *B01J 35/19* (2024.01); *B01D 53/9472* (2013.01); *B01J 21/04* (2013.01); *B01J 23/10* (2013.01);
(Continued)

(58) Field of Classification Search
CPC ... B01J 21/04; B01J 23/10; B01J 23/42; B01J 23/44; B01J 23/464; B01J 35/19; B01J 35/56; B01J 53/9472
(Continued)

(56) References Cited

U.S. PATENT DOCUMENTS 5,376,610 A * 12/1994 Takahata ................. F01N 3/222
                                                      502/65
6,087,298 A *  7/2000 Sung ........................ B01J 35/19
                                                     502/328
(Continued)

FOREIGN PATENT DOCUMENTS

CN    107249737 A    10/2017
CN    108568308 A     9/2018
(Continued)

OTHER PUBLICATIONS

Chinese Office Action (CNOA) dated Mar. 27, 2024 for Chinese Patent Application No. 202080085901.9; English machine translation.

(Continued)

*Primary Examiner* — Cam N. Nguyen
(74) *Attorney, Agent, or Firm* — RANKIN, HILL & CLARK LLP

(57) ABSTRACT

An object of the present invention is to provide an exhaust gas purification catalyst including a wall-flow substrate and a catalyst layer, and having an improved exhaust gas purification performance, and, in order to achieve such an object, the present invention provides an exhaust gas purification catalyst including: a wall-flow substrate, first catalyst layers; and second catalyst layers; wherein the first catalyst layers and the second catalyst layers satisfy the following expressions (1) to (3):

$L1 < L2$            (1)

$T1 < T2$            (2)

$WC1 > WC2$        (3)

(Continued)

wherein L1 represents the length of the first catalyst layers, L2 represents the length of the second catalyst layers, T1 represents the thickness of the rising portions of the first catalyst layers, T2 represents the thickness of the rising portions of the second catalyst layers, WC1 represents the mass of the first catalyst layers per unit volume of the portion of the substrate provided with the first catalyst layers, and WC2 represents the mass of the second catalyst layers per unit volume of the portion of the substrate provided with the second catalyst layers.

5 Claims, 8 Drawing Sheets

(51) Int. Cl.
| | | |
|---|---|---|
| B01J 23/10 | (2006.01) | |
| B01J 23/42 | (2006.01) | |
| B01J 23/44 | (2006.01) | |
| B01J 23/46 | (2006.01) | |
| B01J 35/00 | (2006.01) | |
| B01J 35/56 | (2024.01) | |

(52) U.S. Cl.
CPC ............ *B01J 23/44* (2013.01); *B01J 23/464* (2013.01); *B01J 35/56* (2024.01); *B01D 2255/1021* (2013.01); *B01D 2255/1023* (2013.01); *B01D 2255/1025* (2013.01); *B01D 2255/9032* (2013.01); *B01D 2255/9155* (2013.01); *B01D 2255/9202* (2013.01)

(58) Field of Classification Search
USPC ................ 502/258–262, 300, 332–334, 339
See application file for complete search history.

(56) References Cited

U.S. PATENT DOCUMENTS

| 7,759,290 | B2 * | 7/2010 | Murabayashi | B01J 23/464 |
| | | | | 502/439 |
| 9,011,783 | B2 * | 4/2015 | Schuetze | B01J 37/0244 |
| | | | | 422/171 |
| 9,352,279 | B2 * | 5/2016 | Greenwell | B01J 35/19 |
| 9,366,166 | B2 * | 6/2016 | Blakeman | B01J 23/40 |
| 9,782,753 | B2 * | 10/2017 | Aoki | B01D 53/9422 |
| 10,071,368 | B2 * | 9/2018 | Onoe | F01N 3/035 |
| 10,076,725 | B2 * | 9/2018 | Onoe | B01D 53/94 |
| 10,125,649 | B2 * | 11/2018 | Onoe | B01J 23/42 |
| 10,159,934 | B2 * | 12/2018 | Kitamura | B01J 37/0244 |
| 10,201,805 | B2 * | 2/2019 | Ohashi | F01N 3/022 |
| 10,213,741 | B2 * | 2/2019 | Sato | B01J 23/44 |
| 10,315,192 | B2 * | 6/2019 | Aoki | B01J 37/0201 |
| 10,344,655 | B2 * | 7/2019 | Onoe | F01N 3/035 |
| 10,626,765 | B2 * | 4/2020 | Inoda | B01J 23/44 |
| 10,688,476 | B2 * | 6/2020 | Onoe | F01N 3/101 |
| 10,710,023 | B2 * | 7/2020 | Yanagawa | F01N 3/10 |
| 10,808,585 | B2 * | 10/2020 | Chandler | B01D 53/9472 |
| 10,814,311 | B2 * | 10/2020 | Hoshino | B01D 53/9472 |
| 10,934,910 | B2 * | 3/2021 | Makino | B01J 37/0244 |
| 11,110,435 | B2 * | 9/2021 | Onoe | B01J 37/0248 |
| 11,224,840 | B2 * | 1/2022 | Suzuki | B01J 35/50 |
| 11,286,830 | B2 * | 3/2022 | Saito | B01D 53/945 |
| 11,420,189 | B2 * | 8/2022 | Sawada | B01D 53/94 |
| 2009/0087365 | A1 | 4/2009 | Klingmann et al. | |
| 2009/0107122 | A1 | 4/2009 | Ikeda et al. | |
| 2009/0165444 | A1 | 7/2009 | Oosumi | |
| 2012/0328499 | A1 | 12/2012 | Ando et al. | |
| 2017/0296969 | A1 | 10/2017 | Ohashi et al. | |
| 2017/0298797 | A1 | 10/2017 | Onoe et al. | |
| 2017/0304773 | A1 * | 10/2017 | Onoe | B01D 53/9468 |
| 2017/0312691 | A1 * | 11/2017 | Sato | F01N 3/28 |
| 2018/0021726 | A1 | 1/2018 | Onoe et al. | |
| 2018/0258810 | A1 | 9/2018 | Tsuji et al. | |
| 2020/0276567 | A1 * | 9/2020 | Onoe | B01J 35/19 |
| 2021/0001315 | A1 | 1/2021 | Kurihara et al. | |
| 2021/0164377 | A1 | 6/2021 | Kurihara et al. | |
| 2023/0050366 | A1 * | 2/2023 | Baba | F01N 13/0097 |

FOREIGN PATENT DOCUMENTS

| EP | 3842142 A1 | 6/2021 | | |
| EP | 4011492 A1 | 6/2022 | | |
| JP | 2009-82915 A | 4/2009 | | |
| JP | 5087836 B2 | 12/2012 | | |
| JP | 5769708 B2 | 8/2015 | | |
| JP | 2016-78016 A | 5/2016 | | |
| JP | 6312210 B2 | 4/2018 | | |
| WO | 2017001829 A1 | 1/2017 | | |
| WO | 2017056067 A1 | 4/2017 | | |
| WO | 2018/173557 A1 | 9/2018 | | |
| WO | WO-2019078096 A1 * | 4/2019 | ............ | F01N 3/035 |
| WO | 2019/188620 A1 | 10/2019 | | |
| WO | 2020/039650 A1 | 2/2020 | | |

OTHER PUBLICATIONS

International Search Report (ISR) dated Mar. 2, 2021 filed in PCT/JP2020/047108.
PCT International Preliminary Report on Patentability and Written Opinion of the International Searching Authority dated Mar. 2, 2021 filed in PCT/JP2020/047108.

* cited by examiner

[FIG.1]
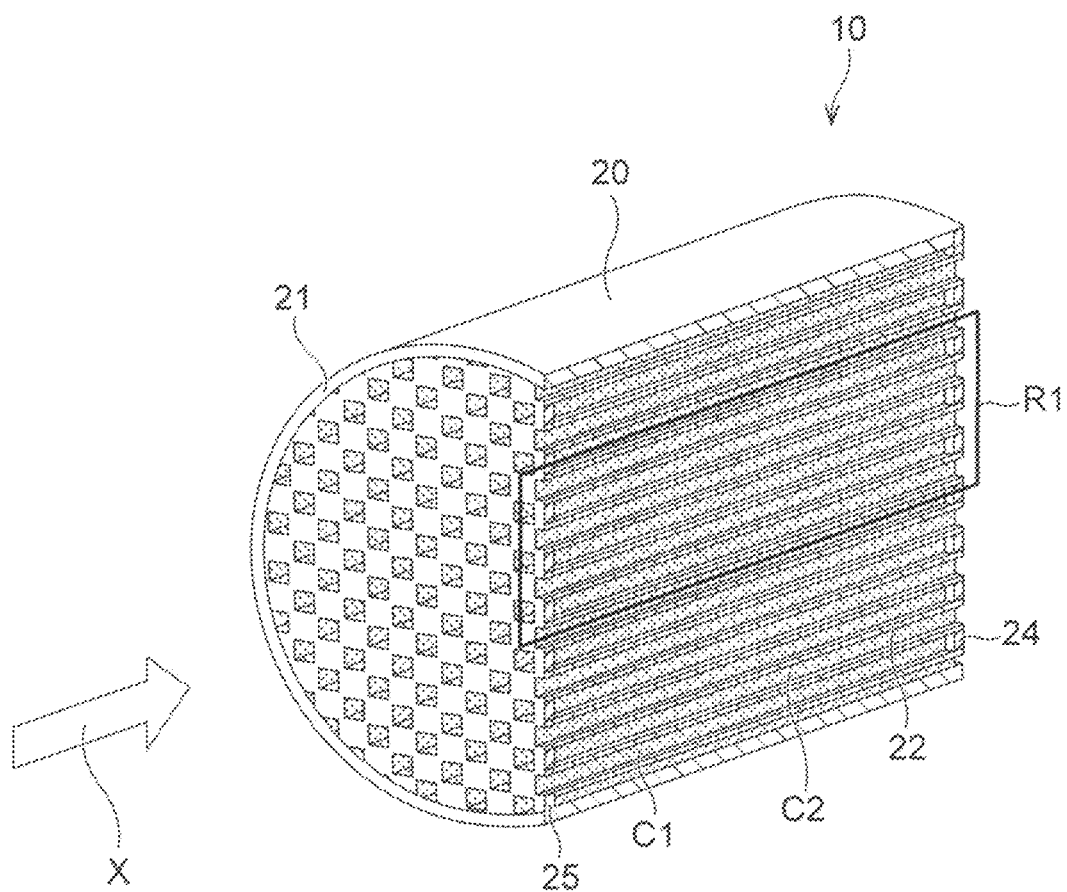

[FIG.2]
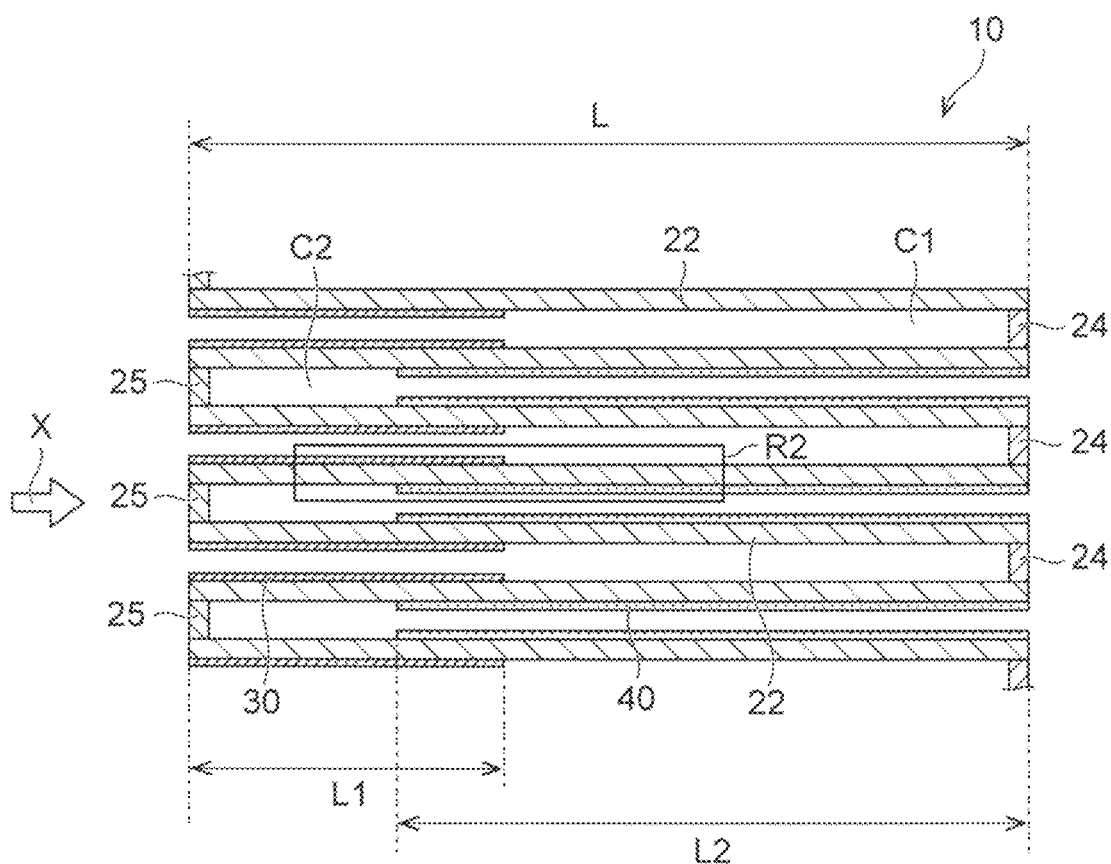

[FIG.3]
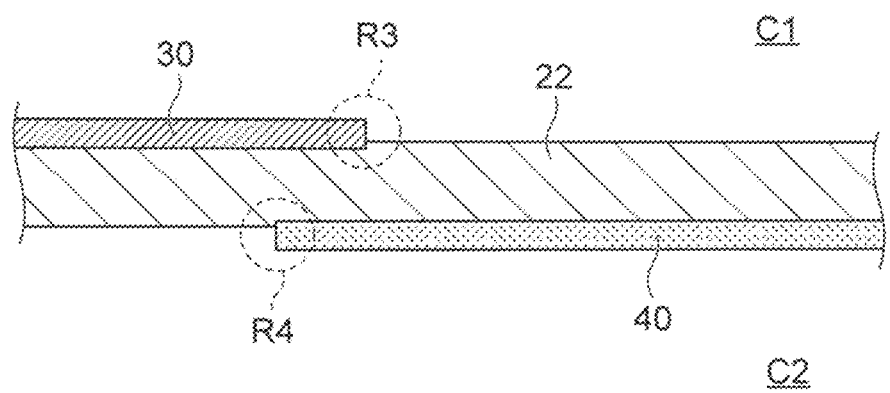

[FIG.4]
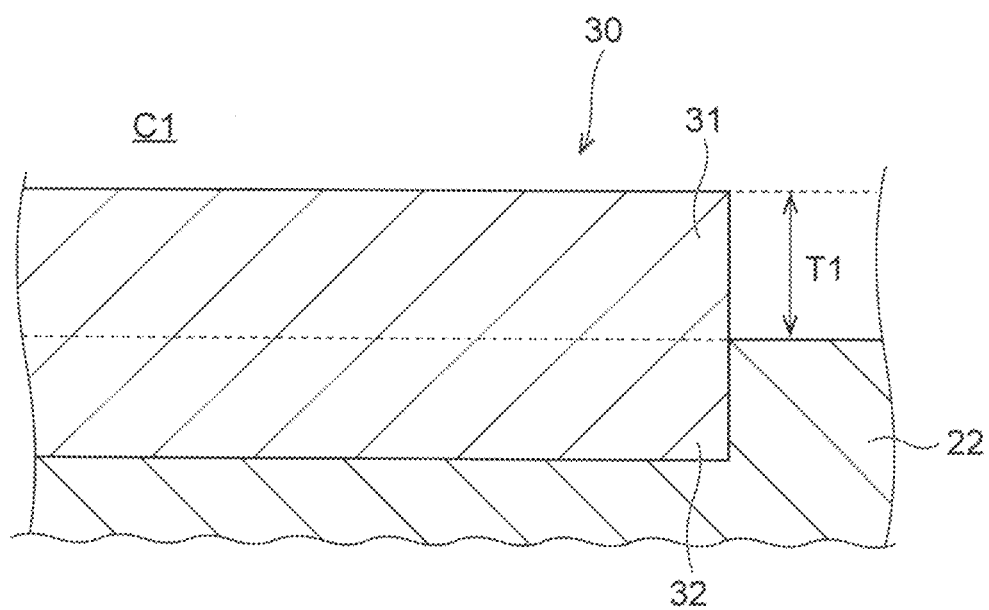

[FIG.5]
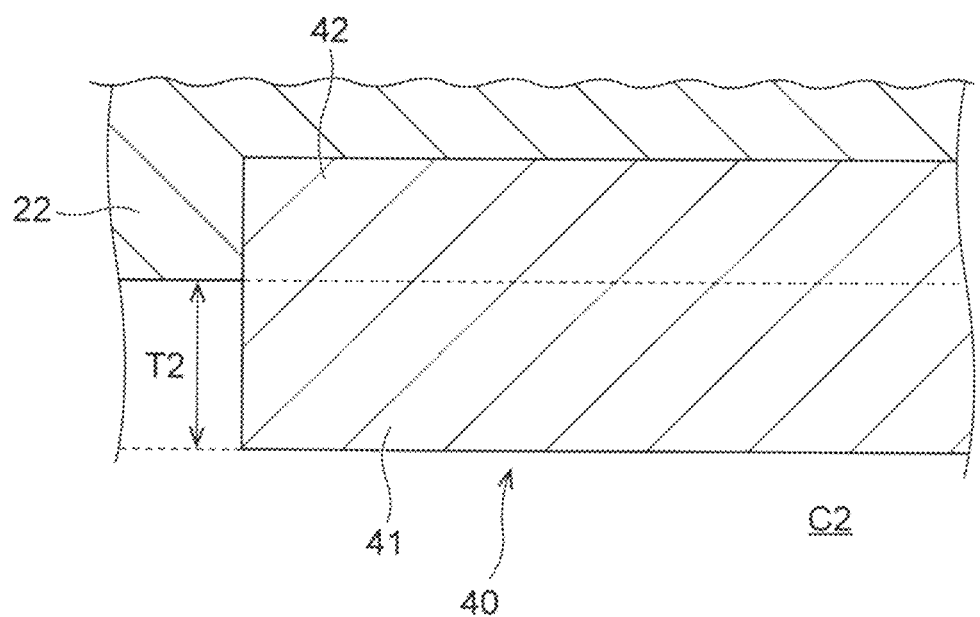

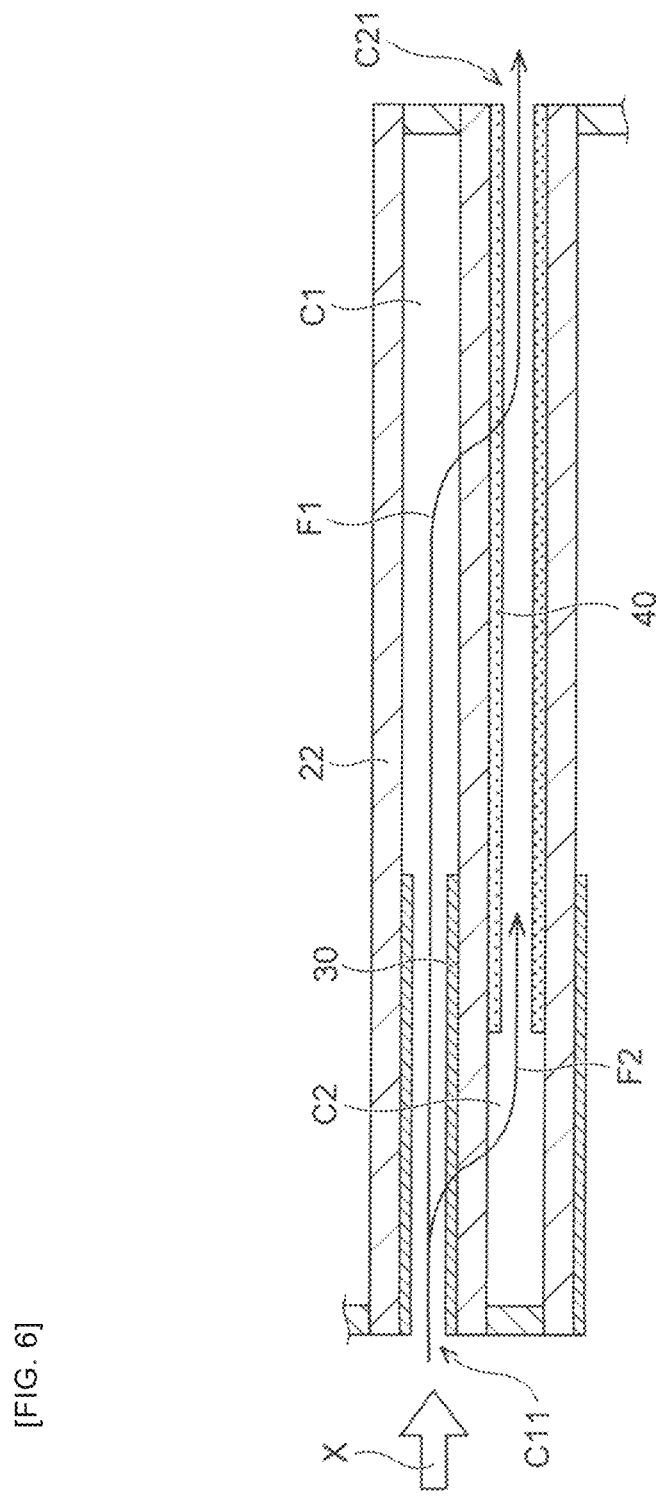
[FIG. 6]

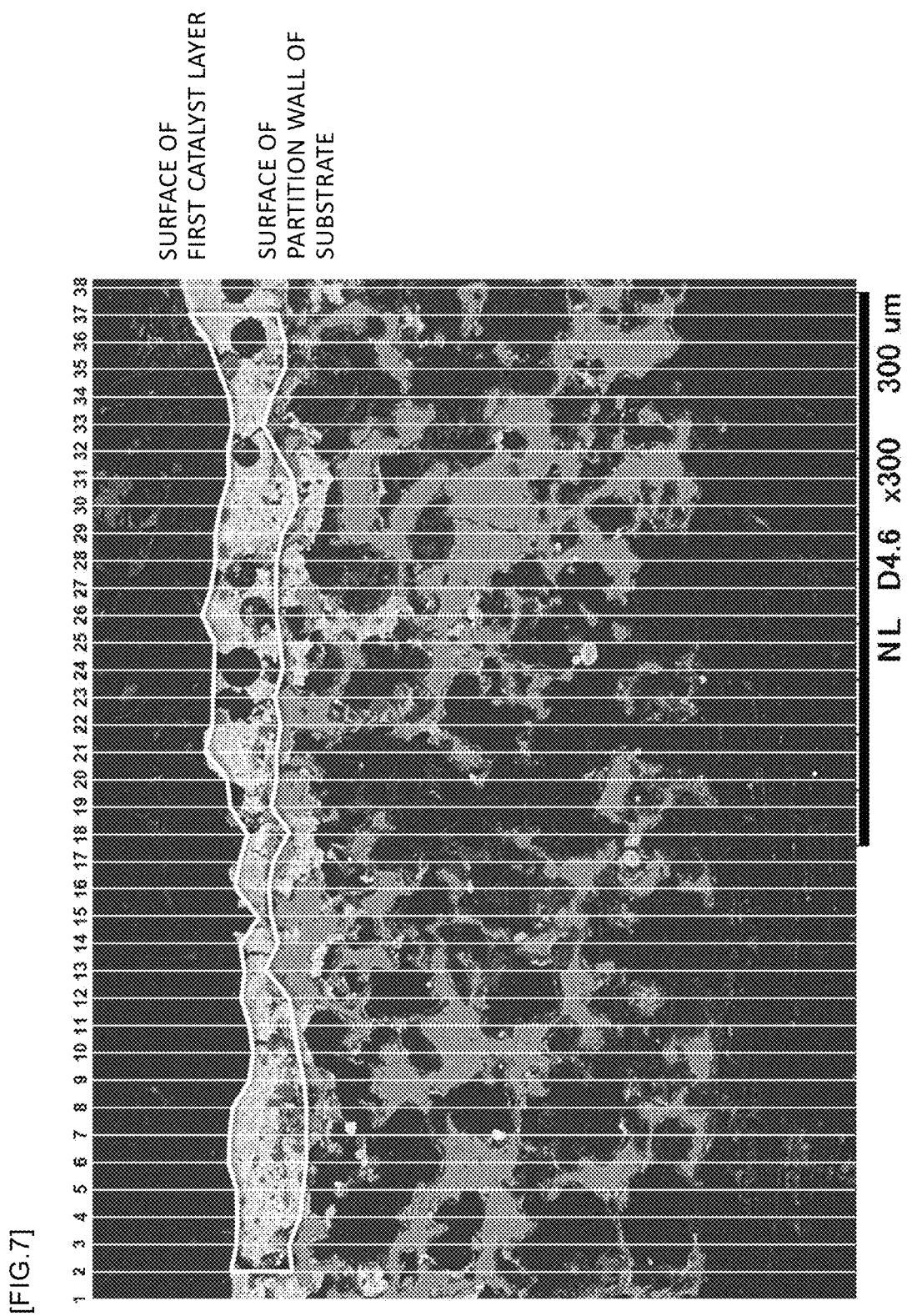
[FIG.7]

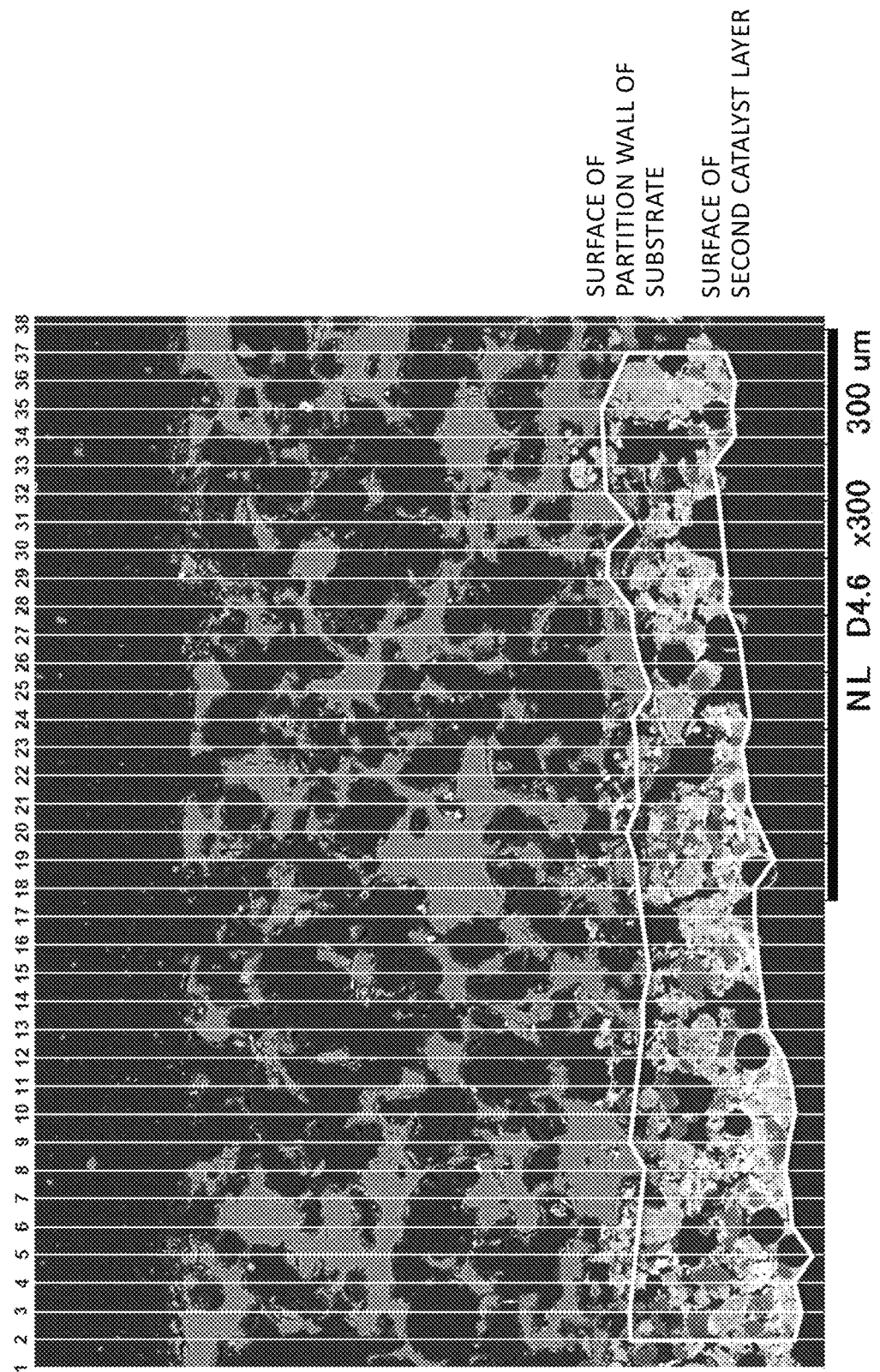
[FIG.8]

EXHAUST GAS PURIFICATION CATALYST

CROSS-REFERENCE TO RELATED APPLICATIONS

This application is a National Phase Application of International Application No. PCT/JP2020/047108, filed Dec. 17, 2020, which claims the priority of Japan Patent Application No. 2019-228405, filed Dec. 18, 2019. The present application claims priority from both applications and each of these applications is herein incorporated in their entirety by reference.

BACKGROUND OF THE INVENTION

Field of the Invention

The present invention relates to an exhaust gas purification catalyst.

Background Art

Exhaust gas discharged from an internal combustion engine of an automobile, a motorcycle or the like contains harmful components such as hydrocarbons (HC), carbon monoxide (CO) and nitrogen oxide (NOx). A three-way catalyst is used to purify and detoxify those harmful components. Noble metal catalysts such as platinum (Pt), palladium (Pd) and rhodium (Rh) are used as a three-way catalyst. Pt and Pd are mainly involved in oxidative purification of HC and CO and Rh is mainly involved in reductive purification of NOx.

In addition to harmful components such as HC, CO and NOx, exhaust gas contains particulate matter (PM), which is known as causing air pollution.

In a vehicle equipped with a gasoline engine, a gasoline direct injection engine (GDI) is used. The GDI is fuel-efficient and high-power, but is known to discharge a larger amount of PM in exhaust gas than a conventional port injection engine. To respond to an environmental regulation on PM, the installation of a filter with a PM collecting function (GPF: Gasoline Particulate Filter) is required, not only for a vehicle equipped with a diesel engine, but also for a vehicle equipped with a gasoline engine such as GDI.

For example, a substrate having a structure called a wall-flow structure is used as a GPF. In the wall-flow substrate, when exhaust gas flows in from a cell inlet, passes through a porous partition wall dividing cells, and flows out from a cell outlet, PM in the exhaust gas is collected in a pore inside the partition wall.

Since space for installing an exhaust gas purification catalyst is usually limited, technologies for collecting PM and purifying harmful components such as HC, CO and NOx by supporting a noble metal catalyst such as Pt, Pd and Rh on a GPF have been studies.

For example, Patent Document 1 discloses an exhaust gas purification catalyst including a palladium-containing layer and a rhodium-containing layer, wherein the palladium-containing layer and the rhodium-containing layer are stacked so that one of the palladium-containing layer and the rhodium-containing layer is positioned inside a partition wall, while the other is positioned on a surface of the partition wall.

Patent Document 2 discloses an exhaust gas purification catalyst including: an inflow-side cell, wherein only an end on an exhaust gas inflow side is open; an outflow-side cell adjacent to the inflow-side cell, wherein only an end on an exhaust gas outflow side is open; a wall-flow substrate having a porous partition wall that separates the inflow-side cell and the outflow-side cell from each other; an upstream catalyst layer provided inside the partition wall; and a downstream catalyst layer provided inside the partition wall, wherein each of the upstream and downstream catalyst layers contains a carrier and at least one noble metal selected from platinum (Pt), palladium (Pd) and rhodium (Rh) supported on the carrier, and wherein the noble metal contained in the upstream catalyst layer is different from the noble metal contained in the downstream catalyst layer.

CITATION LIST

Patent Documents

Patent Document 1: JP 2009-82915 A
Patent Document 2: JP 2016-78016 A

SUMMARY OF THE INVENTION

Technical Problem

However, when catalyst layers are formed in a wall-flow substrate to collect PM and to purify harmful components such as HC, CO and NOx, there is a case where a sufficient exhaust gas purification performance cannot be exhibited. In particular, an improvement in NOx purification performance during high-speed operation has been a big challenge, since a significant amount of NOx is generated due to an increase in temperature in the combustion chamber during high-speed operation.

Therefore, an object of the present invention is to provide an exhaust gas purification catalyst including a wall-flow substrate and catalyst layers, and having an improved exhaust gas purification performance.

Solution to Problem

To solve the above-mentioned problem, the present invention provides an exhaust gas purification catalyst extending in an exhaust gas flow direction, the exhaust gas purification catalyst including:
  a substrate;
  first catalyst layers provided in the substrate; and
  second catalyst layers provided in the substrate;
  wherein the substrate includes:
  inflow-side cells each extending in the exhaust gas flow direction and having an open end on an exhaust gas inflow side thereof and a closed end on an exhaust gas outflow side thereof;
  outflow-side cells each extending in the exhaust gas flow direction and having a closed end on an exhaust gas inflow side thereof and an open end on an exhaust gas outflow side thereof; and
  a porous partition wall separating the inflow-side cells and the outflow-side cells from one another,
  wherein the first catalyst layers each have a portion that is formed on a surface on an inflow-side cell side of the partition wall, and extends from an end on an exhaust gas inflow side of the partition wall along the exhaust gas flow direction,
  wherein the second catalyst layers each have a portion that is formed on a surface on an outflow-side cell side of the partition wall, and extends from an end on an exhaust gas outflow side of the partition wall along a direction opposite to the exhaust gas flow direction, and wherein the first catalyst layers and the second catalyst layers satisfy the following expressions (1) to (3):

$$L1 < L2 \quad (1)$$

$$T1 < T2 \quad (2)$$

$$WC1 > WC2 \quad (3)$$

wherein
L1 represents a length of the first catalyst layers,
L2 represents a length of the second catalyst layers,
T1 represents a thickness of the portions of the first catalyst layers,
T2 represents a thickness of the portions of the second catalyst layers,
WC1 represents a mass of the first catalyst layers per unit volume of a portion of the substrate provided with the first catalyst layers, and
WC2 represents a mass of the second catalyst layers per unit volume of a portion of the substrate provided with the second catalyst layers.

Advantageous Effects of Invention

The present invention provides an exhaust gas purification catalyst having a PM collecting ability as well as an improved exhaust gas purification performance.

BRIEF DESCRIPTION OF THE DRAWINGS

FIG. 1 is a cross-sectional perspective view of an exhaust gas purification catalyst according to one embodiment of the present invention.
FIG. 2 is an enlarged view of the region R1 in FIG. 1
FIG. 3 is an enlarged view of the region R2 in FIG. 2.
FIG. 4 is an enlarged view of the region R3 in FIG. 3.
FIG. 5 is an enlarged view of the region R4 in FIG. 3.
FIG. 6 is a cross-sectional view for illustrating the flow of exhaust gas in the exhaust gas purification catalyst shown in FIG. 1.
FIG. 7 is an SEM observation image, obtained by cutting the exhaust gas purification catalyst produced in Example 1 in a plane perpendicular to the axial direction of the substrate, and observing a first catalyst layer present in the cross section using a scanning electron microscope (SEM).
FIG. 8 is an SEM observation image, obtained by cutting the exhaust gas purification catalyst produced in Example 1 in a plane perpendicular to the axial direction of the substrate, and observing a second catalyst layer present in the cross section using a scanning electron microscope (SEM).

DETAILED DESCRIPTION OF THE INVENTION

Embodiments of the exhaust gas purification catalyst according to the present invention will now be described with reference to drawings.

As shown in FIGS. 1 to 6, an exhaust gas purification catalyst 10 according to one embodiment of the present invention includes: a substrate 20; first catalyst layers 30 provided in the substrate 20; and second catalyst layers 40 provided in the substrate 20.

The exhaust gas purification catalyst 10 is provided in an exhaust path of an internal combustion engine. The exhaust gas purification catalyst 10 is provided, for example, in an exhaust path of a gasoline engine (such as an GDI engine), and used as a gasoline particulate filter (GPF). In each of the drawings, the exhaust gas flow direction of the exhaust path of the internal combustion engine is shown with an arrow X. In the present specification, the upstream side (for example, the left side in FIG. 2) of the exhaust gas flow direction X is sometimes referred to as "exhaust gas inflow side", and the downstream side (for example, the right side in FIG. 2) of the exhaust gas flow direction X is sometimes referred to as "exhaust gas outflow side".

The exhaust gas purification catalyst 10 is provided in the exhaust path of the internal combustion engine such that the axial direction of the substrate 20 roughly coincides with the exhaust gas flow direction X. Thus, the exhaust gas purification catalyst 10 extends in the exhaust gas flow direction X. In the present specification, the "length" refers to the dimension in the axial direction of the substrate 20, unless otherwise defined, and the "thickness" refers to the dimension in the direction perpendicular to the axial direction of the substrate 20, unless otherwise defined.

<<Substrate>>

The substrate 20 will now be described.

The substrate 20 can be made of any material selected as appropriate from materials commonly used for forming substrates of exhaust gas purification catalysts. The material for forming the substrate 20 is preferably a material that allows the substrate 20 to stably maintain its shape even when the substrate 20 is exposed to a high-temperature (such as 400° C. or higher) exhaust gas. Examples of such a material include: ceramics such as cordierite, silicon carbide (SiC) and aluminum titanate; and alloys such as stainless steel.

As shown in FIGS. 1 and 2, the substrate 20 includes a tubular member 21 and a porous partition wall 22 formed inside the tubular member 21.

The axial direction of the substrate 20 coincides with the axial direction of the tubular member 21. In the present embodiment, the tubular member 21 has a hollow cylindrical shape, but may have another tubular shape. Examples of the other tubular shape include a hollow elliptic cylindrical shape, a polygonal tubular shape and the like.

As shown in FIGS. 1 and 2, the substrate 20 has a wall-flow structure. Specifically, the substrate 20 includes inflow-side cells C1 and outflow-side cells C2, and the inflow-side cells C1 and the outflow-side cells C2 are separated from one another by the porous partition wall 22.

As shown in FIGS. 1 and 2, recesses (holes) each having an open end on the exhaust gas inflow side, and recesses (holes) each having an open end on the exhaust gas outflow side are formed in the substrate 20. The space inside each recess having an open end on the exhaust gas inflow side forms each inflow-side cell C1, and the space inside each recess having an open end on the exhaust gas outflow side forms each outflow-side cell C2.

As shown in FIGS. 1 and 2, each inflow-side cell C1 extends in the exhaust gas flow direction X, and has an end on the exhaust gas inflow side and an end on the exhaust gas outflow side. As shown in FIGS. 1 and 2, the end on the exhaust gas inflow side of each inflow-side cell C1 is open, and the end on the exhaust gas outflow side of each inflow-side cell C1 is closed. The end on the exhaust gas inflow side of each inflow-side cell C1 is sometimes referred to as "the opening of each inflow-side cell C1".

As shown in FIGS. 1 and 2, the substrate 20 is provided with a first sealing member 24 that seals the end on the exhaust gas outflow side of each inflow-side cell C1, whereby the end on the exhaust gas outflow side of each inflow-side cell C1 is closed by the first sealing member 24.

As shown in FIG. 1, the shape of the opening of each inflow-side cell C1 in a plan view (the shape when the substrate 20 is viewed in a plan view from the exhaust gas flow direction X) is square. The opening of each inflow-side cell C1 may have another shape in a plan view. Examples of the other shape include various geometric shapes, including: rectangles such as parallelograms, rectangles and trapezoids; polygons such as triangles, hexagons and octagons; and circles and ovals.

As shown in FIGS. 1 and 2, each outflow-side cell C2 extends in the exhaust gas flow direction X, and has an end on the exhaust gas inflow side and an end on the exhaust gas outflow side. As shown in FIGS. 1 and 2, the end on the exhaust gas inflow side of each outflow-side cell C2 is closed, and the end on the exhaust gas outflow side of each outflow-side cell C2 is open. The end on the exhaust gas outflow side of each outflow-side cell C2 is sometimes referred to as "the opening of each outflow-side cell C2".

As shown in FIGS. 1 and 2, the substrate 20 is provided with a second sealing member 25 that seals the end on the exhaust gas inflow side of each outflow-side cell C2, whereby the end on the exhaust gas inflow side of each outflow-side cell C2 is closed by the second sealing member 25.

As shown in FIG. 1, the shape of the opening of each outflow-side cell C2 in a plan view (the shape when the substrate 20 is viewed in a plan view from a direction opposite to the exhaust gas flow direction X) is square. The opening of each outflow-side cell C2 may have another shape in a plan view. Examples of the other shape include various geometric shapes, including: rectangles such as parallelograms, rectangles and trapezoids; polygons such as triangles, hexagons and octagons; and circles and ovals.

The area of the shape in a plain view of the opening of each inflow-side cell C1 may be the same as or different from the area of the shape in a plain view of the opening of each outflow-side cell C2.

The inflow-side cells C1 and the outflow-side cells C2 are provided such that plural outflow-side cells C2 (in the case of the present embodiment, four cells C2) are arranged around and adjacent to one inflow-side cell C1, and the inflow-side cell C1 and the outflow-side cells C2 adjacent to the inflow-side cell C1 are separated from one another by the porous partition wall 22.

The partition wall 22 has a porous structure through which exhaust gas can pass. The partition wall 22 has a thickness of, for example, 150 μm or more and 400 μm or less. The thickness of the partition wall 22 can be determined by the same method as the method of calculating the thicknesses of a catalyst layer to be described later.

As shown in FIG. 2, the substrate 20 has a length L. The length L of the substrate 20 is not particularly limited, and can be adjusted as appropriate.

The number of cells per square inch of the substrate 20 is, for example, 200 cells/inch$^2$ or more and 900 cells/inch$^2$ or less, but not particularly limited thereto. The number of cells per square inch of the substrate 20 means the total number of inflow-side and outflow-side cells C1 and C2 per square inch in a cross section obtained by cutting the substrate 20 in a plane perpendicular to the exhaust gas flow direction X.

<<Catalyst Layers>>

The first catalyst layers 30 and the second catalyst layers 40 will now be described.

As shown in FIGS. 3 and 4, the first catalyst layers 30 are formed on the inflow-side cell C1 side of the partition wall 22.

As shown in FIGS. 3 and 4, the first catalyst layers 30 each include a portion 31 that is formed on the surface on the inflow-side cell C1 side of the partition wall 22, and extends from the end on the exhaust gas inflow side of the partition wall 22 along the exhaust gas flow direction X. The phase "the surface on the inflow-side cell C1 side of the partition wall 22" refers to the outer surface on the inflow-side cell C1 side of the partition wall 22, which defines the external shape of the partition wall 22. The phase "a portion that is formed on the surface on the inflow-side cell C1 side of the partition wall 22" refers to a portion rising from the outer surface on the inflow-side cell C1 side of the partition wall 22 toward the inflow-side cell C1 side.

As shown in FIGS. 3 and 4, the first catalyst layers 30 each include a portion 32 that is present inside the partition wall 22, in addition to the portion 31. Since the partition wall 22 is porous, the portion 32 is usually formed in addition to the portion 31, during the formation of the first catalyst layers 30. The region in which the portion 31 is present does not overlap with the region in which the partition wall 22 is present, while the region in which the portion 32 is present overlaps with the region in which the partition wall 22 is present. Therefore, the portion 31 and the portion 32 can be identified by cutting the exhaust gas purification catalyst 10 in a plane perpendicular to the axial direction of the substrate 20, and observing a first catalyst layer 30 existing in the resulting cross section using a scanning electron microscope (SEM), an electron probe microanalyzer (EPMA) or the like, and identifying the portion 31 and the portion 32 based on the difference in form between the first catalyst layer 30 and the partition wall 22 of the substrate 20. At the time of observing the cross section, element mapping of the cross section may be performed. The element mapping can be performed, for example, using a combination of a cross-sectional observation by SEM and a compositional analysis of the cross-section. The element mapping can be performed, for example, using a scanning electron microscope-energy dispersive X-ray spectrometer (SEM-EDX), an electron probe microanalyzer (EPMA), a transmission X-RAY inspection apparatus or the like. By performing the element mapping of the cross section, the portion 31 and the portion 32 can be identified, based on the difference in form and composition between the first catalyst layer 30 and the partition wall 22 of the substrate 20.

As shown in FIGS. 3 and 5, the second catalyst layers 40 are formed on the outflow-side cell C2 side of the partition wall 22.

As shown in FIGS. 3 and 5, the second catalyst layers 40 each include a portion 41 that is formed on the surface on the outflow-side cell C2 side of the partition wall 22, and extends from the end on the exhaust gas outflow side of the partition wall 22 along the direction opposite to the exhaust gas flow direction X. The phase "the surface on the outflow-side cell C2 side" refers to the outer surface on the outflow-side cell C2 side of the partition wall 22, which defines the external shape of the partition wall 22. The phase "a portion that is formed on the surface on the outflow-side cell C2 side of the partition wall 22" refers to a portion rising from the outer surface on the outflow-side cell C2 side of the partition wall 22 toward the outflow-side cell C2 side.

As shown in FIGS. 3 and 5, the second catalyst layers 40 each include a portion 42 that is present inside the partition wall 22, in addition to the portion 41. Since the partition wall 22 is porous, the portion 41 is usually formed in addition to the portion 42, during the formation of the second catalyst layers 40. The region in which the portion 41 is present does not overlap with the region in which the partition wall 22 is present, while the region in which the portion 42 is present overlaps with the region in which the partition wall 22 is present. Therefore, the portion 41 and the portion 42 can be identified by cutting the exhaust gas purification catalyst 10 in a plane perpendicular to the axial direction of the substrate 20, and observing a second catalyst layer 40 existing in the resulting cross section using a scanning electron microscope (SEM), an electron probe microanalyzer (EPMA) or the like, and identifying the portion 41 and the portion 42 based on the difference in form between the second catalyst layer 40 and the partition wall 22 of the substrate 20. At the time of observing the cross section, element mapping of the cross section may be performed. The element mapping can be performed in the same manner as described above. By performing the element mapping of the cross section, the portion 41 and the portion 42 can be identified, based on the difference in form and composition between the second catalyst layer 40 and the partition wall 22 of the substrate 20.

In the exhaust gas purification catalyst 10, the first catalyst layers 30 and the second catalyst layers 40 satisfy the following expression (1):

$$L1<L2 \quad (1).$$

In the expression (1) described above, L1 represents the length of the first catalyst layers 30 (see FIG. 2), and L2 represents the length of the second catalyst layers 40 (see FIG. 2).

The length L1 of the first catalyst layers 30 and the length L2 of the second catalyst layers 40 are not particularly limited as long as the expression (1) is satisfied. However, the ratio (L2/L1) of the length L2 of the second catalyst layers 40 to the length L1 of the first catalyst layers 30 is preferably more than 1.0 and 2.3 or less, more preferably 1.1 or more and 2.2 or less, still more preferably 1.2 or more and 2.1 or less, yet still more preferably 1.3 or more and 2.0 or less, yet still more preferably 1.4 or more and 1.9 or less, and yet still more preferably 1.5 or more and 1.8 or less, from the viewpoint of more effectively achieving a desired flow of exhaust gas to be described later, and the viewpoint of more effectively achieving a desired exhaust gas purification performance to be described later.

The length L1 of the first catalyst layers 30 is not particularly limited as long as the expression (1) is satisfied. However, the percentage (L1/L×100) of the length L1 of the first catalyst layers 30 to the length L of the substrate 20 is preferably 10% or more and 80% or less, more preferably 20% or more and 70% or less, still more preferably 30% or more and 60% or less, and yet still more preferably 40% or more and 50% or less, from the viewpoint of more effectively achieving a desired flow of exhaust gas to be described later, and the viewpoint of more effectively achieving a desired exhaust gas purification performance to be described later.

The length L2 of the second catalyst layers 40 is not particularly limited as long as the expression (1) is satisfied. However, the percentage (L2/L×100) of the length L2 of the second catalyst layers 40 to the length L of the substrate 20 is preferably 30% or more and 90% or less, more preferably 40% or more and 85% or less, still more preferably 50% or more and 80% or less, and yet still more preferably 65% or more and 75% or less, from the viewpoint of more effectively achieving a desired flow of exhaust gas to be described later, and the viewpoint of more effectively achieving a desired exhaust gas purification performance to be described later.

The percentage ((L1+L2)/L×100) of the total of the length L1 of the first catalyst layers 30 and the length L2 of the second catalyst layers 40 to the length L of the substrate 20 is not particularly limited as long as the expression (1) is satisfied. However, the percentage ((L1+L2)/L×100) is preferably 100% or more and 150% or less, more preferably 101% or more and 145% or less, still more preferably 102% or more and 140% or less, yet still more preferably 103% or more and 135% or less, and yet still more preferably 104% or more and 130% or less, from the viewpoint of more effectively achieving a desired flow of exhaust gas to be described later, and the viewpoint of more effectively achieving a desired exhaust gas purification performance to be described later.

Examples of the methods of calculating the length L1 of the first catalyst layers 30 and the length L2 of the second catalyst layers 40 are as follows.

A sample extending in the axial direction of the substrate 20 and having the same length as the length L of the substrate 20 is cut out from the exhaust gas purification catalyst 10. The sample is, for example, in the form of a cylinder having a diameter of 25.4 mm. The value of the diameter of the sample can be changed, as necessary. The sample is cut at 5 mm intervals in planes perpendicular to the axial direction of the substrate 20 to obtain cut pieces, which are referred to as the first cut piece, the second cut piece and so on up to the n-th cut piece, sequentially from the side of the end on the exhaust gas inflow side of the sample. The length of each cut piece is 5 mm. The composition of each cut piece is analyzed using an X-ray fluorescence analyzer (XRF) (such as an energy dispersive X-ray spectrometer (EDX), a wavelength dispersive X-ray spectrometer (WDX) or the like), an inductively coupled plasma emission spectrophotometer (ICP-AES) or the like, and it is confirmed whether or not the cut piece includes a first catalyst layer 30, based on the composition of the cut piece.

The compositional analysis is not necessarily performed for a cut piece that apparently includes a first catalyst layer 30. For example, it is possible to confirm whether or not each cut piece includes a first catalyst layer 30, by observing the cross section thereof using a scanning electron microscope (SEM), an electron probe microanalyzer (EPMA) or the like. At the time of observing the cross section, element mapping of the cross section may be performed. The element mapping can be performed in the same manner as described above.

After confirming whether or not each cut piece includes a first catalyst layer 30, the length of a first catalyst layer 30 included in the sample is calculated based on the following equation:

Length of first catalyst layer 30 included in sample=5 mm×(number of cut pieces each including first catalyst layer 30)

For example, in the case where each of the first cut piece to the k-th cut piece includes a first catalyst layer 30, but each of the (k+1)-th to the n-th cut pieces does not include a first catalyst layer 30, the length of the first catalyst layer 30 included in the sample is (5×k) mm.

In the case of measuring the length of the first catalyst layer 30 included in the sample more specifically, the length is calculated as follows:

The k-th cut piece (namely, the cut piece closest to the exhaust gas outflow side, among the cut pieces each including a first catalyst layer 30) is cut in the axial direction of the substrate 20, and a first catalyst layer 30 existing in the resulting cross section is observed using a scanning electron microscope (SEM), an electron probe microanalyzer (EPMA) or the like, to measure the length of the first catalyst layer 30 existing in the k-th cut piece. Thereafter, the length of the first catalyst layer 30 included in the sample is calculated based on the following equation:

Length of first catalyst layer 30 included in sample=(5 mm×(k−1))+(length of first catalyst layer 30 in k-th cut piece)

The length of the first catalyst layer 30 included in the sample is calculated for 8 to 16 samples arbitrarily cut out from the exhaust gas purification catalyst 10, and the mean value of the measured lengths is defined as the length L1 of the first catalyst layers 30.

One example of the method of calculating the length L2 of the second catalyst layers 40 is the same as one example of the method of calculating the length L1 of the first catalyst layers 30. In one example of the method of calculating the length L2 of the second catalyst layers 40, a sample is cut at 5 mm intervals in planes perpendicular to the axial direction of the substrate 20 to obtain cut pieces, which are referred to as the first cut piece, the second cut piece and so on up to the n-th cut piece, sequentially from the side of the end on the exhaust gas outflow side of the sample.

In the exhaust gas purification catalyst 10, the first catalyst layers 30 and the second catalyst layers 40 satisfy the following expression (2):

$$T1 < T2 \qquad (2).$$

In the expression (2) described above, T1 represents the thickness T1 of the portions 31 of the first catalyst layers 30 (see FIG. 4), and T2 represents the thickness of the portions 41 of the second catalyst layers 40 (see FIG. 5).

The thickness T1 of the portions 31 of the first catalyst layers 30 and the thickness T2 of the portions 41 of the second catalyst layers 40 are not particularly limited as long as the expression (2) is satisfied. However, the ratio (T2/T1) of the thickness T2 of the portions 41 of the second catalyst layers 40 to the thickness T1 of the portions 31 of the first catalyst layers 30 is preferably more than 1.0 and 3.5 or less, more preferably 1.1 or more and 3.0 or less, still more preferably 1.2 or more and 2.5 or less, and yet still more preferably 1.3 or more and 2.1 or less, from the viewpoint of more effectively achieving a desired flow of exhaust gas to be described later, and the viewpoint of more effectively achieving a desired exhaust gas purification performance to be described later.

The thickness T1 of the portions 31 of the first catalyst layers 30 is not particularly limited as long as the expression (2) is satisfied. However, the thickness T1 is preferably 15 μm or more and 55 μm or less, more preferably 20 μm or more and 50 μm or less, still more preferably 25 μm or more and 45 μm or less, and yet still more preferably 30 μm or more and 40 μm or less, from the viewpoint of more effectively achieving a desired flow of exhaust gas to be described later, and the viewpoint of more effectively achieving a desired exhaust gas purification performance to be described later.

The thickness T2 of the portions 41 of the second catalyst layers 40 is not particularly limited as long as the expression (2) is satisfied. However, the thickness T2 is preferably 20 μm or more and 100 μm or less, more preferably 30 μm or more and 90 μm or less, still more preferably 40 μm or more and 80 μm or less, and yet still more preferably 45 μm or more 65 μm or less, from the viewpoint of more effectively achieving a desired flow of exhaust gas to be described later, and the viewpoint of more effectively achieving a desired exhaust gas purification performance to be described later.

Examples of the methods of calculating the thickness T1 of the portions 31 of the first catalyst layers 30 and the thickness T2 of the portions 41 of the second catalyst layers 40 are as follows.

The exhaust gas purification catalyst 10 is cut in a plane perpendicular to the axial direction of the substrate 20 (for example, at a position 10 mm away from the end on the exhaust gas inflow side of the substrate 20 in the exhaust gas flow direction X), and a first catalyst layer 30 existing in one inflow-side cell C1 arbitrarily selected from the resulting cross section is observed using a scanning electron microscope (SEM), to identify the region in which the partition wall 22 of the substrate 20 is present and the region in which the first catalyst layer 30 is present. In the cross-sectional observation by SEM, the field magnification is, for example, 300 times, and the field width (length) is, for example, from 500 to 600 μm. The region to be observed by SEM is selected so as not to include any of the corners of the inflow-side cell C1. This is because the permeability of exhaust gas is low and the degree of contribution to achieving a desired flow of exhaust gas to be described later is small, at the corners of the inflow-side cell C1. The region in which the partition wall 22 of the substrate 20 is present and the region in which the first catalyst layer 30 is present can be identified based on the difference in form between the first catalyst layer 30 and the partition wall 22 of the substrate 20. At this time, element mapping of the cross section may be performed. The element mapping can be performed in the same manner as described above. By performing the element mapping of the cross section, the region in which the partition wall 22 of the substrate 20 is present and the region in which the first catalyst layer 30 is present can be identified based on the difference in form and composition between the first catalyst layer 30 and the partition wall 22 of the substrate 20.

In the SEM observation image, the first to the N-th grid lines parallel to the thickness direction of the partition wall 22 of the substrate 20 are drawn at 15 μm intervals, sequentially from the left end side or the right end side of the image, and the intersections of the outline of the region in which the partition wall 22 of the substrate 20 is present and the respective grid lines are connected with straight lines, to identify the position of the surface of the partition wall 22 of the substrate 20. N is, for example, an integer from 30 to 50. In the same manner, the intersections of the outline of the region in which the first catalyst layer 30 is present and the respective grid lines are connected with straight lines, to identify the position of the surface of the first catalyst layer 30. In the case where the amount of change in the thickness direction from a certain intersection P1 to an intersection P2 adjacent to the intersection P1 exceeds the interval (15 μm) between two adjacent grid lines, it is preferred not to use the intersection P2 in the identification of the position of the surfaces (namely, to exclude the intersection P2 from the intersections to be connected with straight lines). The "amount of change in the thickness direction from a certain intersection P1 to an intersection P2 adjacent to the intersection P1" refers to the distance between the straight line that passes through the intersection P1 and is perpendicular to the thickness direction of the partition wall 22 of the substrate 20, and the straight line that passes through the intersection P2 and is perpendicular to the thickness direction of the partition wall 22 of the substrate 20. In the case where the amount of change in the thickness direction from the intersection P1 to the intersection P2 adjacent to the intersection P1 exceeds the interval (15 μm) between two adjacent grid lines, and the amount of change in the thickness direction from the intersection P1 to an intersection P3 adjacent to the intersection P2 also exceeds the interval (15 μm) between two adjacent grid lines, it is preferred not to use the intersection P3 in addition to the intersection P2 in the identification of the position of the surfaces (namely, to exclude the intersection P2 and the intersection P3 from the intersections to be connected with straight lines). When five successive intersections are excluded from the intersections to be connected with straight lines in such a manner, it is preferred not to perform the measurement of the thickness in this SEM image.

After identifying the position of the surface of the partition wall 22 of the substrate 20 and the position of the surface of the first catalyst layer 30, the area of the region surrounded by the second grid line, the (N−1)-th grid line, the surface of the partition wall 22 of the substrate 20 and the surface of the first catalyst layer 30, is determined, using image analysis software. For example, AreaQ (manufactured by S-Tech Corporation), ImageJ (public domain), Photoshop (manufactured by Adobe Systems Inc.) or the like can be used as the image analysis software. The first grid line and the N-th grid line are not used, because the image is more likely to be unclear at both ends thereof, making it difficult to identify the position of the surface of the partition wall 22 and the position of the surface of the first catalyst layer 30.

After determining the area of the above-described region, the thickness of the above-described region is calculated based on the following equation:

Thickness of the above-described region=area of the above-described region/(interval between grid lines×number of intervals between grid lines)

The interval between the grid lines is 15 μm, and the number of intervals between the grid lines is (N−3).

The thickness of the above-described region is calculated for 20 inflow-side cells C1 arbitrarily selected from the cross section, and the mean value of the measured thicknesses is defined as the thickness T1 of the portions 31 of the first catalyst layers 30.

One example of the method of calculating the thickness T2 of the portions 41 of the second catalyst layers 40 is the same as one example of the method of calculating the thickness T1 of the portions 31 of the first catalyst layers 30. In one example of the method of calculating the thickness T2 of the portions 41 of the second catalyst layers 40, the exhaust gas purification catalyst 10 is cut in a plane perpendicular to the axial direction of the substrate 20 (for example, at a position 10 mm away from the end on the exhaust gas outflow side of the substrate 20, in the direction opposite to the exhaust gas flow direction X), and a second catalyst layer present in an outflow-side cell C2 arbitrarily selected from the resulting cross section is observed using a scanning electron microscope (SEM).

In the exhaust gas purification catalyst 10, the first catalyst layers 30 and the second catalyst layers 40 satisfy the following expression (3):

$$WC1 > WC2 \quad (3)$$

In the expression (3) described above, WC1 represents the mass of the first catalyst layers 30 per unit volume of the portion of the substrate 20 provided with the first catalyst layers 30, and WC2 represents the mass of the second catalyst layers 40 per unit volume of the portion of the substrate 20 provided with the second catalyst layers 40.

WC1, which is the mass of the first catalyst layers 30 per unit volume of the portion of the substrate 20 provided with the first catalyst layers 30, and WC2, which is the mass of the second catalyst layers 40 per unit volume of the portion of the substrate 20 provided with the second catalyst layers 40, are not particularly limited as long as the expression (3) is satisfied. However, the ratio (WC1/WC2) of WC1 to WC2 is preferably more than 1.0 and 3.5 or less, more preferably 1.05 or more and 2.5 or less, still more preferably 1.10 or more and 2.0 or less, yet still more preferably 1.11 or more and 2.0 or less, and yet still more preferably 1.12 or more and 1.5 or less, from the viewpoint of more effectively achieving a desired flow of exhaust gas to be described later, and the viewpoint of more effectively achieving a desired exhaust gas purification performance to be described later.

WC1, which is the mass of the first catalyst layers 30 per unit volume of the portion of the substrate 20 provided with the first catalyst layers 30, is not particularly limited as long as the expression (3) is satisfied. However, WC1 is preferably 50 g/L or more and 90 g/L or less, more preferably 55 g/L or more and 80 g/L or less, and still more preferably 60 g/L or more and 70 g/L or less, from the viewpoint of more effectively achieving a desired flow of exhaust gas to be described later, and the viewpoint of more effectively achieving a desired exhaust gas purification performance to be described later.

WC2, which is the mass of the second catalyst layers 40 per unit volume of the portion of the substrate 20 provided with the second catalyst layers 40, is not particularly limited as long as the expression (3) is satisfied. However, WC2 is preferably 40 g/L or more and 90 g/L or less, more preferably 50 g/L or more and 80 g/L or less, and still more preferably 55 g/L or more and 70 g/L or less, from the viewpoint of more effectively achieving a desired flow of exhaust gas to be described later, and the viewpoint of more effectively achieving a desired exhaust gas purification performance to be described later.

One example of the method of calculating WC1, which is the mass of the first catalyst layers 30 per unit volume of the portion of the substrate 20 provided with the first catalyst layers 30, or WC2, which is the mass of the second catalyst layers 40 per unit volume of the portion of the substrate 20 provided with the second catalyst layers 40, is as follows.

One example of the method of calculating WC2, which is the mass of the second catalyst layers 40 per unit volume of the portion of the substrate 20 provided with the second catalyst layers 40, will now be described.

A sample extending in the axial direction of the substrate 20 and having the same length as the length L of the substrate 20 is cut out from the exhaust gas purification catalyst 10, and the sample is cut in planes perpendicular to the axial direction of the substrate 20, to prepare a cut piece S2 of the exhaust gas purification catalyst 10 which includes a second catalyst layer 40 but does not include a first catalyst layer 30. The cut piece S2 is, for example, in the form of a cylinder having a diameter of 25.4 mm and a length of 10 mm. The values of the diameter and the length of the cut piece S2 can be changed, as necessary. In the vicinity of the end on the exhaust gas outflow side of the exhaust gas purification catalyst 10, the second catalyst layers 40 are present but the first catalyst layers 30 are absent, since the length L1 of the first catalyst layers 30 is shorter than the length L2 of the second catalyst layers 40. Therefore, the cut piece S2 can be obtained from the vicinity of the end on the exhaust gas outflow side of the exhaust gas purification catalyst 10. The length of the second catalyst layer 40 included in the cut piece S2 is identical to the length of the cut piece S2.

A cut piece of the substrate 20 having the same size as that of the cut piece S2 is prepared. The cut piece of the substrate 20 does not include either a first catalyst layer 30 or a second catalyst layer 40.

The mass of the cut piece S2 and the mass of the cut piece of the substrate 20 are measured, and the mass of the second catalyst layer 40 per unit volume of the cut piece S2 is calculated based on the following equation:

Mass of second catalyst layer 40 per unit volume of cut piece S2=((mass of cut piece S2)−(mass of cut piece of substrate 20))/(volume of cut piece S2)

The volume of the cut piece S2 is the apparent volume of the cut piece S2. For example, in the case where the cut piece S2 is in the form of a cylinder having a diameter of 25.4 mm and a length of 10 mm, the volume of the cut piece S2 is $n \times (12.7 \text{ mm})^2 \times 10$ mm. The same applies to the volumes of other cut pieces (e.g., cut pieces S1 and S3 to be described later).

The mass of the second catalyst layer 40 per unit volume of the cut piece S2 is calculated for three cut pieces S2 prepared from arbitrary locations of the exhaust gas purification catalyst 10, and the mean value of the calculated values is defined as WC2, which is the mass of the second catalyst layers 40 per unit volume of the portion of the substrate 20 provided with the second catalyst layers 40.

At the time of calculating the WC2, the mass of the second catalyst layer 40 per unit volume of the cut piece S2 may be calculated, without using the cut piece of the substrate 20. One example of such a calculation method is as follows. The mass and the volume of the cut piece S2 are measured. The composition of the substrate 20 included in the cut piece S2 is identified by the element mapping of the cross section of the cut piece S2. The composition of the cut piece S2 is identified by an analysis using an inductively coupled plasma emission spectrophotometer or the like. Based on the thus identified compositions of the substrate 20 and the cut piece S2, the proportion of the mass of the second catalyst layer 40 to the mass of the cut piece S2 is calculated. The mass of the second catalyst layer 40 per unit volume of the cut piece S2 is calculated based on the following equation:

Mass of second catalyst layer 40 per unit volume of cut piece S2=(mass of cut piece S2)×(proportion of mass of second catalyst layer 40 to mass of cut piece S2)/(volume of cut piece S2)

One example of the method of calculating WC1, which is the mass of the first catalyst layers 30 per unit volume of the portion of the substrate 20 provided with the first catalyst layers 30 will now be described.

In the case where the second catalyst layers 40 do not extend to the end on the exhaust gas inflow side of the partition wall 22, a sample extending in the axial direction of the substrate 20 and having the same length as the length L of the substrate 20 is cut out from the exhaust gas purification catalyst 10, and the sample is cut in planes perpendicular to the axial direction of the substrate 20, to prepare a cut piece S1 of the exhaust gas purification catalyst 10 which includes a first catalyst layer 30 but does not include a second catalyst layer 40. The cut piece S1 is, for example, in the form of a cylinder having a diameter of 25.4 mm and a length of 10 mm. The values of the diameter and the length of the cut piece S1 can be changed, as necessary. In the case where the second catalyst layers 40 do not extend to the end on the exhaust gas inflow side of the partition wall 22, the first catalyst layers 30 are present but the second catalyst layers 40 are absent, in the vicinity of the end on the exhaust gas inflow side of the exhaust gas purification catalyst 10. Therefore, the cut piece S1 can be obtained from the vicinity of the end on the exhaust gas inflow side of the exhaust gas purification catalyst 10. The length of the first catalyst layer 30 included in the cut piece S1 is identical to the length of the cut piece S1.

A cut piece of the substrate 20 having the same size as that of the cut piece S1 is prepared. The cut piece of the substrate 20 does not include either a first catalyst layer 30 or a second catalyst layer 40.

The mass of the cut piece S1 and the mass of the cut piece of the substrate 20 are measured, and the mass of the first catalyst layer 30 per unit volume of the cut piece S1 is calculated based on the following equation:

Mass of first catalyst layer 30 per unit volume of cut piece S1=((mass of cut piece S1)−(mass of cut piece of substrate 20))/(volume of cut piece S1)

The mass of the first catalyst layer 30 per unit volume of the cut piece S1 is calculated for three cut pieces S1 prepared from arbitrary locations of the exhaust gas purification catalyst 10, and the mean value of the calculated values is defined as WC1, which is the mass of the first catalyst layers 30 per unit volume of the portion of the substrate 20 provided with the first catalyst layers 30.

At the time of calculating the WC1, it is also possible to calculate the mass of the first catalyst layer 30 per unit volume of the cut piece S1, without using the cut piece of the substrate 20. One example of such a calculation method is the same as one example of the method of calculating the mass of the second catalyst layer 40 per unit volume of the cut piece S2, without using the cut piece of the substrate 20.

In the case where the second catalyst layers 40 extend to the end on the exhaust gas inflow side of the partition wall 22, a sample extending in the axial direction of the substrate 20 and having the same length as the length L of the substrate 20 is cut out from the exhaust gas purification catalyst 10, and the sample is cut in planes perpendicular to the axial direction of the substrate 20, to prepare a cut piece S3 of the exhaust gas purification catalyst 10 which includes both a first catalyst layer 30 and a second catalyst layer 40. The cut piece S3 is, for example, in the form of a cylinder having a diameter of 25.4 mm and a length of 10 mm. The values of the diameter and the length of the cut piece S3 can be changed, as necessary. In the case where the second catalyst layers 40 extend to the end on the exhaust gas inflow side of the partition wall 22, the first catalyst layers 30 and the second catalyst layers 40 are present in the vicinity of the end on the exhaust gas inflow side of the exhaust gas purification catalyst 10. Therefore, the cut piece S3 can be obtained from the vicinity of the end on the exhaust gas inflow side of the exhaust gas purification catalyst 10. Both of the lengths of the first catalyst layer 30 and the second catalyst layer 40 included in the cut piece S3 are identical to the length of the cut piece S3.

A cut piece of the substrate 20 having the same size as that of the cut piece S3 is prepared. The cut piece of the substrate 20 does not include either a first catalyst layer 30 or a second catalyst layer 40.

The mass of the cut piece S3 and the mass of the cut piece of the substrate 20 are measured, and the total mass of the first catalyst layer 30 and the second catalyst layer 40 per unit volume of the cut piece S3 is calculated based on the following equation:

Total mass of first catalyst layer 30 and second catalyst layer 40 per unit volume of cut piece S3= ((mass of cut piece S3)−(mass of cut piece of substrate 20))/(volume of cut piece S3)

The total mass of the first catalyst layer 30 and the second catalyst layer 40 per unit volume of the cut piece S3 is calculated for three cut pieces S3 prepared from arbitrary locations of the exhaust gas purification catalyst 10, to obtain a mean value of the calculated values. Thereafter, the value obtained by subtracting WC2, which is the mass of the second catalyst layers 40 per unit volume of the portion of the substrate 20 provided with the second catalyst layers 40, from the mean value of the calculated values (namely, the mean total mass of the first catalyst layer 30 and the second catalyst layer 40 included in the cut pieces S3, minus WC2, which is the mass of the second catalyst layers 40 per unit volume of the portion of the substrate 20 provided with the second catalyst layers 40), is defined as WC1, which is the mass of the first catalyst layers 30 per unit volume of the portion of the substrate 20 provided with the first catalyst layers 30.

At the time of calculating the WC1, it is also possible to calculate the total mass of the first catalyst layer 30 and the second catalyst layer 40 per unit volume of the cut piece S3, without using the cut piece of the substrate 20. One example of such a calculation method is the same as one example of the method of calculating the mass of the second catalyst layer 40 per unit volume of the cut piece S2, without using the cut piece of the substrate 20.

The first catalyst layers 30 and the second catalyst layers 40 each contain a catalytically-active component(s). The first catalyst layers 30 and the second catalyst layers 40 may each contain one kind of catalytically-active component, or two or more kinds of catalytically-active components. The second catalyst layers 40 preferably each contain a catalytically-active component(s) different from a catalytically-active component(s) contained in the first catalyst layers 30, from the viewpoint of enhancing the exhaust gas purification performance. Examples of the catalytically-active component(s) include noble metal elements such as platinum element (Pt), palladium element (Pd), rhodium element (Rh), ruthenium element (Ru), iridium element (Ir) and osmium element (Os). A noble metal element is contained in each of the first catalyst layers 30 or in each of the second catalyst layers 40, in a form capable of functioning as a catalytically-active component, for example, in a form of a noble metal, an alloy containing a noble metal element, a compound containing a noble metal element (e.g., an oxide of a noble metal element), or the like. The catalytically-active component(s) is/are preferably in a form of particles, from the viewpoint of enhancing the exhaust gas purification performance. It is preferred that the first catalyst layers 30 and the second catalyst layers 40 each contain at least one catalytically-active component independently selected from the group consisting of platinum element (Pt), palladium element (Pd) and rhodium element (Rh), from the viewpoint of enhancing the exhaust gas purification performance. From the viewpoint of enhancing the NOx purification performance, among the exhaust gas purification performance, it is preferred that at least one of the first catalyst layers 30 and the second catalyst layers 40 contain rhodium element (Rh), and it is more preferred that both of the first catalyst layers 30 and the second catalyst layers 40 contain rhodium element (Rh).

The first catalyst layers 30 and the second catalyst layers 40 may each have a single-layer structure, or a laminated structure. The laminated structure is, for example, a two-layer structure composed of a lower layer and an upper layer. The lower layer is a layer located on the side of the partition wall 22 compared to the upper layer.

In the case where each of the first catalyst layers 30 has a laminated structure, the portion 31 of each of the first catalyst layers 30 may be formed of the entirety or a part of one layer, or may be formed of the entirety of one or more layers and the entirety or a part of another layer. For example, when each of the first catalyst layers 30 has a two-layer structure, the portion 31 of each of the first catalyst layers 30 may be formed of the entirety or a part of the upper layer, or may be formed of the entirety of the upper layer and a part of the lower layer.

In the case where each of the second catalyst layers 40 has a laminated structure, the portion 41 of each of the second catalyst layers 40 may be formed of the entirety or a part of one layer, or may be formed of the entirety of one or more layers and the entirety or a part of another layer. For example, when each of the second catalyst layers 40 has a two-layer structure, the portion 41 of each of the second catalyst layers 40 may be formed of the entirety or a part of the upper layer, or may be formed of the entirety of the upper layer and a part of the lower layer.

In the laminated structure, a catalytically-active component contained in a certain layer and a catalytically-active component contained in another layer may be the same as or different from each other. When a catalytically-active component contained in a certain layer in the laminated structure is different from a catalytically-active component contained in another layer in the laminated structure, it is possible to prevent a decrease in the catalytic performance due to a plurality of catalytically-active components being contained in a single layer.

In one embodiment, each of the first catalyst layers 30 has a single-layer structure, and each of the second catalyst layers 40 has a two-layer structure (composed of a lower layer and an upper layer). The lower layer is a layer located on the side of the partition wall 22 compared to the upper layer. In this embodiment, it is preferred that each of the first catalyst layers 30 contains rhodium element (Rh), the lower layer of each of the second catalyst layers 40 contains a noble metal element (such as palladium element (Pd)) other than rhodium element (Rh), and the upper layer of each of the second catalyst layers 40 contains rhodium element (Rh). This enables to enhance the NOx purification performance, particularly, the NOx purification performance during high-speed operation, and to decrease the amount of NOx emission.

From the viewpoint of enhancing the exhaust gas purification performance, the amount of the catalytically-active component(s) contained in the first catalyst layers 30 or the second catalyst layers 40 is preferably 0.001% by mass or more, more preferably 0.01% by mass or more, and still more preferably 0.05% by mass or more, with respect to the total mass of the first catalyst layers 30 or the total mass of the second catalyst layers 40. In view of the balance between the exhaust gas purification performance and the cost, on the other hand, the amount of the catalytically-active component(s) contained in the first catalyst layers 30 or the second catalyst layers 40 is preferably 25% by mass or less, more preferably 20% by mass or less, and still more preferably 15% by mass or less, with respect to the total mass of the first catalyst layers 30 or the total mass of the second catalyst layers 40. The amount of the catalytically-active component(s) can be measured using a conventional method, such as inductively coupled plasma emission spectrophotometry (ICP-AES). The mass of a noble metal element is the mass in terms of metal.

From the viewpoint of enhancing the exhaust gas purification performance, the amount of the catalytically-active component(s) contained in the first catalyst layers 30 or the second catalyst layers 40 is preferably 0.01 g or more, and more preferably 0.05 g or more, per liter of the volume of the substrate 20. In view of the balance between the exhaust gas purification performance and the cost, on the other hand, the amount of the catalytically-active component(s) contained in the first catalyst layers 30 or the second catalyst layers 40 is preferably 10 g or less, and may optionally be 5 g or less or 3 g or less, per liter of the volume of the substrate 20. The volume of the substrate 20 is the apparent volume of the substrate 20. When the outer diameter of the tubular member 21 is defined as 2r, the volume of the substrate 20 can be represented by the equation: volume of substrate $20=\pi \times r^2 \times$ (length L of substrate 20).

One example of the method of calculating the amount of the catalytically-active component(s) contained in the second catalyst layers 40 per liter of the volume of the substrate 20 is as follows.

A cut piece S2 is prepared in the same manner as described above, the amount of the catalytically-active component(s) contained in the cut piece S2 is measured using a conventional method such as inductively coupled plasma emission spectrophotometry (ICP-AES), and the amount of the catalytically-active component(s) per unit volume of the cut piece S2 is calculated. The amount of the catalytically-active component(s) per unit volume of the cut piece S2 is calculated for three cut pieces S2 prepared from arbitrary locations of the exhaust gas purification catalyst 10, and the mean value of the resulting values is calculated. The amount of the catalytically-active component(s) contained in the second catalyst layers 40 per liter of the volume of the substrate 20, is calculated based on the following equation:

> Amount of catalytically-active component(s) contained in second catalyst layers 40 per liter of volume of substrate 20=(mean amount of catalytically-active component(s) per unit volume of cut piece $S2$)×(length $L2$ of second catalyst layers 40/length $L$ of substrate 20)

One example of the method of calculating the amount of the catalytically-active component(s) contained in the first catalyst layers 30 per liter of the volume of the substrate 20 is as follows.

In the case where the second catalyst layers 40 do not extend to the end on the exhaust gas inflow side of the partition wall 22, a cut piece S1 is prepared in the same manner as described above, the amount of the catalytically-active component(s) contained in the cut piece S1 is measured using a conventional method such as inductively coupled plasma emission spectrophotometry (ICP-AES), and the amount of the catalytically-active component(s) per unit volume of the cut piece S1 is calculated. The amount of the catalytically-active component(s) per unit volume of the cut piece S1 is calculated for three cut pieces S1 prepared from arbitrary locations of the exhaust gas purification catalyst 10, and the mean amount of the obtained amounts is calculated. The amount of the catalytically-active component(s) contained in the first catalyst layers 30 per liter of the volume of the substrate 20, is calculated based on the following equation:

> Amount of catalytically-active component(s) contained in first catalyst layers 30 per liter of volume of substrate 20=(mean amount of catalytically-active component(s) per unit volume of cut piece $S1$)×(length $L1$ of first catalyst layers 30/length $L$ of substrate 20)

In the case where the second catalyst layers 40 extend to the end on the exhaust gas inflow side of the partition wall 22, a cut piece S3 is prepared in the same manner as described above, the amount of the catalytically-active component(s) contained in the cut piece S3 is measured using a conventional method such as inductively coupled plasma emission spectrophotometry (ICP-AES), and the amount of the catalytically-active component(s) per unit volume of the cut piece S3 is calculated. The amount of the catalytically-active component(s) per unit volume of the cut piece S3 is calculated for three cut pieces S3 prepared from arbitrary locations of the exhaust gas purification catalyst 10, and the mean amount of the obtained amounts is calculated. The amount of the catalytically-active component(s) contained in the first catalyst layers 30 per liter of the volume of the substrate 20, is calculated based on the following equation:

> Amount of catalytically-active component(s) contained in first catalyst layers 30 per liter of volume of substrate 20=((mean amount of catalytically-active component(s) per unit volume of cut piece $S3$)–(mean amount of catalytically-active component(s) per unit volume of cut piece $S2$))×(length $L1$ of first catalyst layers 30/length $L$ of substrate 20)

It is preferred that the first catalyst layers 30 and the second catalyst layers 40 each further contain a carrier component that supports the catalytically-active component(s), from the viewpoint of efficiently obtaining the exhaust gas purification performance by the catalytically-active component(s). Examples of the carrier component include inorganic oxide particles, and examples of an inorganic oxide constituting the inorganic oxide particles include an oxygen storage component (also referred to as "OSC material"), an inorganic oxide other than the oxygen storage component, and the like. From the viewpoint of stably achieving a high exhaust gas purification performance against fluctuations in air fuel ratio, the first catalyst layers 30 and the second catalyst layers 40 each preferably contain an oxygen storage component as the carrier component, and more preferably contain an oxygen storage component and an inorganic oxide other than the oxygen storage component.

The expression that "an inorganic oxide particle supports a catalytically-active component(s)" refers to a state in which the catalytically-active component(s) is/are physically or chemically adsorbed or retained on the outer surface, or the inner surface of the pores, of the inorganic oxide particle. For example, when an inorganic oxide particle and a catalytically-active component(s) are present in the same region in the element mapping obtained by analyzing a cross section of the exhaust gas purification catalyst 10 by an EDS (energy dispersive spectrometer), it can be determined that the inorganic oxide particle supports the catalytically-active component(s). Further, it is possible to confirm the fact that the inorganic oxide particle supports the catalytically-active component(s) by a particle size measurement using a scanning electron microscope (SEM). The catalytically-active component(s) present on the surface of the inorganic oxide particle preferably has/have an average particle size of 10% or less, more preferably 3% or less, and still more preferably 1% or less, with respect to the average particle size of the inorganic oxide particle. The "average particle size" as used herein refers to the mean value of the Feret diameters of 30 or more particles as observed by SEM.

The oxygen storage component is not particularly limited as long as it is a metal oxide in which the valence change of the constituting elements occurs under the operating conditions of the exhaust gas purification catalyst, and which is capable of storing oxygen. Examples of the oxygen storage component include a metal oxide containing cerium element (Ce). Examples of the metal oxide containing Ce include $CeO_2$ and $CeO_2$—$ZrO_2$ (such as a ceria-zirconia composite oxide containing Ce and Zr, or a solid solution of $CeO_2$ and $ZrO_2$). Whether or not $CeO_2$ and $ZrO_2$ have formed a solid solution can be confirmed by examining whether a single phase derived from $CeO_2$—$ZrO_2$ has been formed, using an X-ray diffractometer (XRD). The oxygen storage component is preferably a porous material, because the catalytically-active component(s) can be more easily supported thereto.

The amount of cerium element (Ce) in terms of oxide ($CeO_2$) which can be contained in the first catalyst layers 30 is preferably 5% by mass or more and 40% by mass or less, and more preferably 10% by mass or more and 30% by mass or less, with respect to the total mass of the first catalyst layers 30. The amount of zirconium element (Zr) in terms of oxide ($ZrO_2$) which can be contained in the first catalyst layers 30 is preferably 10% by mass or more and 80% by mass or less, and more preferably 25% by mass or more and 60% by mass or less, with respect to the total mass of the first catalyst layers 30. The amount of cerium element (Ce) in terms of oxide ($CeO_2$) and the amount of zirconium element (Zr) in terms of oxide ($ZrO_2$) can be measured using a conventional method such as inductively coupled plasma emission spectrophotometry (ICP-AES).

The amount of cerium element (Ce) in terms of oxide ($CeO_2$) which can be contained in the second catalyst layers 40 is preferably 5% by mass or more and 40% by mass or less, and more preferably 10% by mass or more and 30% by mass or less, with respect to the total mass of the second catalyst layers 40. The amount of zirconium element (Zr) in terms of oxide ($ZrO_2$) which can be contained in the second catalyst layers 40 is preferably 10% by mass or more and 70% by mass or less, and more preferably 30% by mass or more and 50% by mass or less, with respect to the total mass of the second catalyst layers 40. The amount of cerium element (Ce) in terms of oxide ($CeO_2$) and the amount of zirconium element (Zr) in terms of oxide ($ZrO_2$) can be measured using a conventional method such as inductively coupled plasma emission spectrophotometry (ICP-AES).

The oxygen storage component may contain a rare earth element other than cerium element (Ce). Examples of the rare earth element other than Ce include scandium element (Sc), yttrium element (Y), lanthanum element (La), praseodymium element (Pr), neodymium element (Nd), samarium element (Sm), europium element (Eu), gadolinium element (Gd), terbium element (Tb), dysprosium element (Dy), holmium element (Ho), erbium element (Er), thulium element (Tm), ytterbium element (Yb) and lutetium element (Lu). Such a rare earth elements can be added to the oxygen storage component, for example, as an oxide. An oxide of a rare earth element is represented as $Ln_2O_3$ (Ln represents a rare earth element) excluding the cases of praseodymium element (Pr) and terbium element (Tb). An oxide of praseodymium element is usually represented as $Pr_6O_{11}$, and an oxide of terbium element is usually represented as $Tb_4O_7$. An oxide of a rare earth element may or may not form a solid solution with $CeO_2$—$ZrO_2$. Whether or not an oxide of a rare earth element has formed a solid solution with $CeO_2$—$ZrO_2$ can be confirmed using an X-ray diffractometer (XRD) in the same manner as described above.

Examples of other oxygen storage components include oxides of elements (such as Mn, Fe and Cu) whose valence states are prone to change under catalyst usage conditions, and composite oxides containing these elements.

Examples of the inorganic oxide other than the oxygen storage component include alumina, silica, silica-alumina, titania and aluminosilicates. Among these, alumina is preferred from the viewpoint of improving the heat resistance. The inorganic oxide other than the oxygen storage component is preferably a porous material, because the catalytically-active component(s) can be more easily supported thereto.

The amount of the inorganic oxide other than the oxygen storage component which can be contained in the first catalyst layers 30 is preferably 4% by mass or more and 50% by mass or less, and more preferably 7% by mass or more and 30% by mass or less, with respect to the total mass of the first catalyst layers 30. The amount of the inorganic oxide other than the oxygen storage component can be measured using a conventional method such as inductively coupled plasma emission spectrophotometry (ICP-AES).

The amount of the inorganic oxide other than the oxygen storage component which can be contained in the second catalyst layers 40 is preferably 5% by mass or more and 50% by mass or less, and more preferably 10% by mass or more and 30% by mass or less, with respect to the total mass of the second catalyst layers 40. The amount of the inorganic oxide other than the oxygen storage component can be measured using a conventional method such as inductively coupled plasma emission spectrophotometry (ICP-AES).

The inorganic oxide other than the oxygen storage component may be modified by the oxygen storage component, or may support the oxygen storage component. For example, the outer surface, or the inner surface of the pores, of alumina or the like may be modified by the oxygen storage component. Alternatively, the oxygen storage component may be supported on the outer surface, or the inner surface of the pores, of alumina or the like, in a dispersed state.

The first catalyst layers 30 and the second catalyst layers 40 may each contain an alkaline earth metal compound, from the viewpoints of reducing a decrease in catalytic activity due to phosphorus poisoning, improving the heat resistance, and the like. Examples of the alkaline earth metal element include barium element (Ba), strontium element (Sr) and calcium element (Ca). Examples of the alkaline earth metal compound include nitrates, carbonates, sulfates and oxides.

<<Flow of Exhaust Gas>>

When the first catalyst layers 30 and the second catalyst layers 40 satisfy the expressions (1) to (3) described above, the exhaust gas purification catalyst 10 has an improved exhaust gas purification performance (particularly, an exhaust gas purification performance during high-speed operation of an internal combustion engine). It is thought that the flow of exhaust gas in the exhaust gas purification catalyst 10 is involved in this effect. The flow of exhaust gas in the exhaust gas purification catalyst 10 will now be described with reference to FIG. 6.

As shown in FIG. 6, a path F1 or a path F2 can be the flow of exhaust gas in the exhaust gas purification catalyst 10. In the path F1, the exhaust gas flowing in the exhaust gas flow direction X flows into the exhaust gas purification catalyst 10 from an end C11 on the exhaust gas inflow side of the inflow-side cell C1, sequentially passes through the partition wall 22 and the second catalyst layer 40, arrives at the outflow-side cell C2, and flows out of the exhaust gas purification catalyst 10 from an end C21 on the exhaust gas outflow side of the outflow-side cell C2. In the path F2, the exhaust gas flowing in the exhaust gas flow direction X flows into the exhaust gas purification catalyst 10 from the end C11 on the exhaust gas inflow side of the inflow-side cell C1, sequentially passes through the first catalyst layer 30 and the partition wall 22, arrives at the outflow-side cell C2, and flows out of the exhaust gas purification catalyst 10 from the end C21 on the exhaust gas outflow side of the outflow-side cell C2.

When the first catalyst layers 30 and the second catalyst layers 40 satisfy the expressions (1) to (3), the path F1 is thought to be dominant as the flow of exhaust gas in the exhaust gas purification catalyst 10. The following mechanism is assumed as the reason for the above. While the thickness T1 of the portions 31 of the first catalyst layers 30 is smaller than the thickness T2 of the portions 41 of the second catalyst layers 40, WC1 which is the mass of the first catalyst layers 30 per unit volume of the portion of the substrate 20 provided with the first catalyst layers 30 is larger than WC2 which is the mass of the second catalyst layers 40 per unit volume of the portion of the substrate 20 provided with the second catalyst layers 40, and thus the densities of the first catalyst layers 30 are larger than the densities of the second catalyst layers 40. Therefore, the exhaust gas flowed into the exhaust gas purification catalyst 10 from the end C11 on the exhaust gas inflow side of the inflow-side cell C1 is more likely to pass through the second catalyst layers 40 than through the first catalyst layers 30. Further, the length L2 of the second catalyst layers 40 through which the exhaust gas is more likely to pass, is larger than the length L1 of the first catalyst layers 30 through which the exhaust gas is less likely to pass. As a result, the path F1 is thought to be dominant as the flow of exhaust gas in the exhaust gas purification catalyst 10.

When the path F2 is dominant, the exhaust gas flowing in the exhaust gas flow direction X flows into the exhaust gas purification catalyst 10 from the end C11 on the exhaust gas inflow side of the inflow-side cell C1, sequentially passes through the first catalyst layer 30 and the partition wall 22, arrives at the outflow-side cell C2, and flows out of the exhaust gas purification catalyst 10 from the end C21 on the exhaust gas outflow side of the outflow-side cell C2. In this case, particulate matter (PM) in the exhaust gas is more likely to accumulate in the first catalyst layers 30. PM accumulated in the first catalyst layers 30 obstructs the contact of the catalytically-active component(s) contained in the first catalyst layers 30 with harmful components such as hydrocarbons (HC), carbon monoxide (CO) and nitrogen oxide (NOx) in the exhaust gas, leading to a decrease in the exhaust gas purification performance of the first catalyst layers 30. In particular, if PM in the exhaust gas emitted during the period until an internal combustion engine achieves high-speed operation is accumulated in the first catalyst layers 30, it leads to a marked decrease in the exhaust gas purification performance during the high-speed operation of the internal combustion engine.

When the path F1 is dominant, in contrast, the exhaust gas flowing in the exhaust gas flow direction X flows into the exhaust gas purification catalyst 10 from the end C11 on the exhaust gas inflow side of the inflow-side cell C1, sequentially passes through the partition wall 22 and the second catalyst layer 40, arrives at the outflow-side cell C2, and flows out of the exhaust gas purification catalyst 10 from the end C21 on the exhaust gas outflow side of the outflow-side cell C2. In this case, particulate matter (PM) in the exhaust gas is more likely to accumulate in the partition wall 22, and less likely to accumulate in the first catalyst layers 30 and the second catalyst layers 40. Therefore, the contact of the catalytically-active component(s) contained in the first catalyst layers 30 and the second catalyst layers 40 with harmful components such as hydrocarbons (HC), carbon monoxide (CO) and nitrogen oxide (NOx) in the exhaust gas is less likely to be obstructed by PM, allowing the exhaust gas purification performance of the first catalyst layers 30 and the second catalyst layers 40 to be exhibited sufficiently. As a result, the exhaust gas purification performance when the path F1 is dominant is improved as compared to the exhaust gas purification performance when the path F2 is dominant. In particular, the exhaust gas purification performance during the high-speed operation of an internal combustion engine is markedly improved.

When it is intended to improve the NOx purification performance (the NOx purification performance particularly during the high-speed operation of an internal combustion engine), among the exhaust gas purification performance, it is preferred that at least one of the first catalyst layers 30 and the second catalyst layers 40 each contain rhodium element (Rh).

When the path F1 is dominant, particulate matter (PM) in the exhaust gas is more likely to accumulate in the partition wall 22, and less likely to accumulate in the first catalyst layers 30 and the second catalyst layers 40. Therefore, the contact of the rhodium element (Rh) contained in the first catalyst layers 30 and/or the second catalyst layers 40 with NOx in the exhaust gas is less likely to be obstructed by PM, allowing the NOx purification performance of the first catalyst layers 30 and/or the second catalyst layers 40 to be exhibited sufficiently. As a result, the NOx purification performance when the path F1 is dominant is improved as compared to the NOx purification performance when the path F2 is dominant. In particular, the NOx purification performance during the high-speed operation of an internal combustion engine is markedly improved.

When the case in which the path F1 is dominant is compared with the case in which the path F2 is dominant, there is a marked difference in the NOx purification performance of rhodium element (Rh) contained in the first catalyst layers 30. Therefore, the effect when the path F1 is dominant is prominent when at least the first catalyst layers 30, of the first catalyst layers 30 and the second catalyst layers 40, each contain rhodium element (Rh).

From the viewpoint of allowing the NOx purification performance of rhodium element (Rh) contained in the second catalyst layers 40 to be more effectively exhibited when each of the second catalyst layers 40 contains rhodium element (Rh), it is preferred that each of the second catalyst layers 40 has a two-layer structure (composed of a lower layer and an upper layer), the lower layer of each of the second catalyst layers 40 contains a noble metal element (such as palladium element (Pd)) other than rhodium element (Rh), and the upper layer of each of the second catalyst layers 40 contains rhodium element (Rh). The lower layer is a layer located on the side of the partition wall 22 compared to the upper layer. When the path F1 is dominant, the exhaust gas sequentially passes through the partition wall 22 and the second catalyst layer 40. At this time, PM in the exhaust gas is more likely to accumulate in the lower layer of each of the second catalyst layers 40, and less likely to accumulate in the upper layer of each of the second catalyst layers 40. Therefore, the NOx purification performance of rhodium element (Rh) contained in the upper layer of each of the second catalyst layers 40 is less likely to be affected by PM. As a result, the NOx purification performance of the second catalyst layers 40 is more effectively exhibited when each of the second catalyst layers 40 has a two-layer structure (composed of a lower layer and an upper layer), the lower layer of each of the second catalyst layers 40 contains a noble metal (such as palladium element (Pd)) other than rhodium element (Rh), and the upper layer of each of the second catalyst layers 40 contains rhodium element (Rh).

<<Production Method>>

A method of producing the exhaust gas purification catalyst 10 will now be described.

The substrate 20, a slurry for forming the first catalyst layers 30, and a slurry for forming the second catalyst layers 40 are prepared. In the case where each of the first catalyst layers 30 has a laminated structure, two or more kinds of slurries are prepared as the slurry for forming the first catalyst layers 30. In the case where each of the second catalyst layers 40 has a laminated structure, two or more kinds of slurries are prepared as the slurry for forming the second catalyst layers 40.

The composition of the slurry for forming the first catalyst layers 30 is adjusted depending on the composition of the first catalyst layers 30. The composition of the slurry for forming the second catalyst layers 40 is adjusted depending on the composition of the second catalyst layers 40. Each slurry contains, for example, a supply source of a noble metal element, inorganic oxide particles, a binder, a pore forming agent, a solvent and/or the like. The supply source of a noble metal element may be, for example, a salt of a noble metal element, and examples of the salt of a noble metal element include nitrates, ammine complex salts, acetates and chlorides. The inorganic oxide particles may be, for example, particles of an oxygen storage component, and particles of an inorganic oxide other than the oxygen storage component. Details regarding the oxygen storage component and the inorganic oxide other than the oxygen storage component are the same as described above. Examples of the binder include alumina sol, zirconia sol, titania sol and silica sol. Examples of the pore forming agent include cross-linked polymethyl (meth)acrylate particles, cross-linked polybutyl (meth)acrylate particles, cross-linked polystyrene particles, cross-linked polyacrylate particles and melamine-based resins. Examples of the solvent include water and organic solvents. Examples of the organic solvent include alcohol, acetone, dimethyl sulfoxide and dimethylformamide. One kind of solvent may be used, or two or more kinds of solvents may be used as a mixture. The mixture of two or more kinds of solvents may be, for example, a mixture of water and one or more organic solvents, a mixture of two or more kinds of organic solvents, or the like.

The end on the exhaust gas inflow side of the substrate 20 is dipped in the slurry for forming the first catalyst layers 30, and the slurry is suctioned from the opposite side, followed by drying. When each of the first catalyst layers 30 has a laminated structure, this operation is repeated. In this manner, precursor layers of the first catalyst layers 30 are formed. It is possible to adjust the length of the precursor layers of the first catalyst layers 30 (eventually, the length L1 of the first catalyst layers 30), by adjusting the solid concentration, viscosity and the like of the slurry. Further, by adjusting the coating amount of the slurry, the types of materials for forming the slurry, the particle size of the pore forming agent contained in the slurry and the like, it is possible to adjust the thickness of the precursor layers of the first catalyst layers 30 (eventually, the thickness T1 of the portions 31 of the first catalyst layers 30), and the mass of the precursor layers of the first catalyst layers 30 per unit volume of the portion of the substrate 20 provided with the precursor layers of the first catalyst layers 30 (eventually, WC1 which is the mass of the first catalyst layers 30 per unit volume of the portion of the substrate 20 provided with the first catalyst layers 30). The drying temperature is usually 40° C. or higher and 120° C. or lower. The drying time is adjusted as appropriate depending on the drying temperature.

The end on the exhaust gas outflow side of the substrate 20 is dipped in the slurry for forming the second catalyst layers 40, and the slurry is suctioned from the opposite side, followed by drying. When each of the second catalyst layers 40 has a laminated structure, this operation is repeated. In this manner, precursor layers of the second catalyst layers 40 are formed. It is possible to adjust the length of the precursor layers of the second catalyst layers 40 (eventually, the length L2 of the second catalyst layers 40), by adjusting the solid concentration, viscosity and the like of the slurry. Further, by adjusting the coating amount of the slurry, the types of materials for forming the slurry, the particle size of the pore forming agent contained in the slurry and the like, it is possible to adjust the thickness of the precursor layers of the second catalyst layers 40 (eventually, the thickness T2 of the portions 41 of the second catalyst layers 40), and the mass of the precursor layers of the second catalyst layers 40 per unit volume of the portion of the substrate 20 provided with the precursor layers of the second catalyst layers 40 (eventually, WC2 which is the mass of the second catalyst layers 40 per unit volume of the portion of the substrate 20 provided with the second catalyst layers 40). The drying temperature is usually 40° C. or higher and 120° C. or lower. The drying time is adjusted as appropriate depending on the drying temperature.

The particle size of the pore forming agent can be adjusted as appropriate. However, the median $D_{50}$ of the pore forming agent is usually 5 µm or more and 50 µm or less, preferably 5 µm or more and 40 µm or less, and more preferably 10 µm or more and 30 µm or less, from the viewpoints of reducing delamination, reducing pressure drop, and improving the PM collecting performance, and the like. The larger the particle size of the pore forming agent is, the larger the thickness of the first catalyst layers 30 (eventually, the thickness T1 of the portions 31 of the first catalyst layers 30) and the thickness of the second catalyst layers 40 (the thickness T2 of the portions 41 of the second catalyst layers 40) become. The $D_{50}$ is the particle size at which the cumulative volume reaches 50%, in a particle size distribution based on volume as measured by the laser diffraction scattering particle size distribution measurement method. The $D_{50}$ is measured by: introducing the pore forming agent into an aqueous dispersion medium, using an automatic sample feeder ("Microtorac SDC" manufactured by MicrotracBEL Corporation) for a laser diffraction scattering particle size distribution analyzer, irradiating a 40-W ultrasonic wave for 360 seconds in a flow velocity of 26 mL/sec, followed by measurement using a laser diffraction scattering particle size distribution analyzer (manufactured by MicrotracBEL Corporation "Microtrac MT3300EXII"). The measurement is carried out twice, under the conditions of particle refractive index: 1.5, particle shape: true sphere, solvent refractive index: 1.3, set-zero: 30 seconds, and measurement time: 30 seconds, and the mean value of the measured values is defined as $D_{50}$. Pure water is used as the aqueous dispersion medium.

The particle size of the inorganic oxide particles can be adjusted as appropriate. However, the $D_{90}$ of the inorganic oxide particles is preferably 10 µm or more and 40 µm or less, more preferably 15 µm or more and 35 µm or less, and still more preferably 20 µm or more and 30 µm or less, from the viewpoints of reducing delamination, reducing pressure drop, and improving the PM collecting performance, and the like. The $D_{90}$ is the particle size at which the cumulative volume reaches 90%, in a particle size distribution based on volume as measured by the laser diffraction scattering particle size distribution measurement method. The $D_{90}$ is measured by: introducing the inorganic oxide particles into an aqueous dispersion medium, using an automatic sample feeder ("Microtorac SDC" manufactured by MicrotracBEL Corporation) for a laser diffraction scattering particle size distribution analyzer, irradiating a 40-W ultrasonic wave for 360 seconds in a flow velocity of 26 mL/sec, followed by measurement using a laser diffraction scattering particle size distribution analyzer (manufactured by MicrotracBEL Corporation "Microtrac MT3300EXII"). The measurement is carried out twice, under the conditions of particle refractive index: 1.5, particle shape: true sphere, solvent refractive index: 1.3, set-zero: 30 seconds, and measurement time: 30 seconds, and the mean value of the measured values is defined as $D_{90}$. Pure water is used as the aqueous dispersion medium.

After the formation of the precursor layers of the first catalyst layers 30 and the second catalyst layers 40, the resulting substrate is calcined. In this manner, the first catalyst layers 30 and the second catalyst layers 40 are formed. The calcination temperature is usually 350° C. or higher and 550° C. or lower. The calcination time is usually 2 hours or more and 5 hours or less. The calcination is carried out usually in an air atmosphere.

EXAMPLES

The present invention will now be specifically described with reference to Examples. However, the present invention is in no way limited to the Examples.

Example 1

(1) Preparation of First Slurry

A $CeO_2$—$ZrO_2$ solid solution powder and an alumina powder were prepared. As the $CeO_2$—$ZrO_2$ solid solution powder, a $CeO_2$—$ZrO_2$ solid solution powder containing 15% by mass of $CeO_2$, 70% by mass of $ZrO_2$ and 15% by mass of an oxide of a rare earth element other than Ce was used.

The $CeO_2$—$ZrO_2$ solid solution powder and the alumina powder were mixed to prepare a mixed powder. The mass ratio of the $CeO_2$—$ZrO_2$ solid solution powder and the alumina powder (the mass of the $CeO_2$—$ZrO_2$ solid solution powder: the mass of the alumina powder) in the mixed powder was adjusted to 84:8. The $D_{90}$ of the mixed powder was 25 μm.

The mixed powder was introduced into an aqueous solution of rhodium nitrate to obtain a mixed liquid. The resulting mixed liquid, a pore forming agent (cross-linked polymethyl (meth)acrylate particles having a median diameter $D_{50}$ of 20 μm), an alumina sol, a zirconia sol, and water as a solvent were mixed to prepare a first slurry.

The amount of moisture (such as moisture contained in the aqueous solution of rhodium nitrate, moisture as the solvent, and moisture contained in the alumina sol and the zirconia sol) contained in the first slurry was adjusted to 78% by mass, with respect to the mass (100% by mass) of the first slurry.

The amounts of the pore forming agent, the alumina sol, the zirconia sol and rhodium contained in the first slurry were adjusted such that the amount of the pore forming agent was 10% by mass, the solid content of the alumina sol was 3% by mass, the solid content of the zirconia sol was 5% by mass, and the amount of rhodium in terms of metal was 0.3% by mass, with respect to the mass (100% by mass) of the catalyst layers formed by drying and calcining the first slurry.

The mass of the catalyst layers formed by drying and calcining the first slurry is obtained by subtracting the mass of the components (such as the solvent and the pore forming agent) that disappear by drying and calcining the first slurry, from the mass of the first slurry.

(2) Preparation of Second Slurry

A $CeO_2$—$ZrO_2$ solid solution powder and an alumina powder were prepared. As the $CeO_2$—$ZrO_2$ solid solution powder, a $CeO_2$—$ZrO_2$ solid solution powder containing 40% by mass of $CeO_2$, 50% by mass of $ZrO_2$ and 10% by mass of an oxide of a rare earth element other than Ce was used.

The $CeO_2$—$ZrO_2$ solid solution powder and the alumina powder were mixed to prepare a mixed powder. The mass ratio (the mass of the $CeO_2$—$ZrO_2$ solid solution powder: the mass of the alumina powder) of the $CeO_2$—$ZrO_2$ solid solution powder and the alumina powder in the mixed powder was adjusted to 60:22 The $D_{90}$ of the mixed powder was 30 μm.

The mixed powder was introduced into an aqueous solution of palladium nitrate to obtain a mixed liquid. The resulting mixed liquid, a pore forming agent (cross-linked polymethyl (meth)acrylate particles having a median diameter $D_{50}$ of 20 μm), barium hydroxide, an alumina sol, a zirconia sol, and water as a solvent were mixed to prepare a second slurry.

The amount of moisture (such as moisture contained in the aqueous solution of palladium nitrate, moisture as the solvent, and moisture contained in the alumina sol and the zirconia sol) contained in the second slurry was adjusted to 85% by mass, with respect to the mass (100% by mass) of the second slurry.

The amounts of the pore forming agent, barium hydroxide, the alumina sol, the zirconia sol and palladium contained in the second slurry were adjusted such that the amount of the pore forming agent was 25% by mass, the amount of barium hydroxide in terms of barium carbonate was 8.6% by mass, the solid content of the alumina sol was 3% by mass, the solid content of the zirconia sol was 3% by mass, and the amount of palladium in terms of metal was 3.8% by mass, with respect to the mass (100% by mass) of the catalyst layers formed by drying and calcining the second slurry.

The mass of the catalyst layers formed by drying and calcining the second slurry is obtained by subtracting the mass of the components (such as the solvent and the pore forming agent) that disappear by drying and calcining the second slurry, from the mass of the second slurry.

(3) Production of Exhaust Gas Purification Catalyst

A substrate having the structure shown in FIG. 1, namely, a substrate including inflow-side cells each extending in the axial direction of the substrate, outflow-side cells each extending in the axial direction of the substrate, and a porous partition wall separating the inflow-side cells and the outflow-side cells from one another was prepared. The thickness of the partition wall is 254 μm, and the total number of inflow-side and outflow-side cells in a cross section perpendicular to the axial direction of the substrate is 300 cells per square inch, and the volume of the substrate is 1.4 L. The area of the opening of the inflow-side cell at the end surface on the inflow side of the substrate and the area of the opening of the outflow-side cell at the end surface on the outflow side of the substrate are roughly the same.

The end on the exhaust gas inflow side of the substrate was dipped in the first slurry, and the first slurry was suctioned from the opposite side, followed by drying at 70° C. for 10 minutes. In this manner, precursor layers (first catalyst layers before being subjected to calcination) composed of the solids of the first slurry were formed on the inflow-side cell side of the partition wall of the substrate. The thus formed layers extend from the end on the exhaust gas inflow side of the substrate along the exhaust gas flow direction.

After drying, the end on the exhaust gas outflow side of the substrate was dipped in the second slurry, and the second slurry was suctioned from the opposite side, followed by drying at 70° C. for 10 minutes. In this manner, precursor layers composed of the solids of the second slurry were formed on the outflow-side cell side of the partition wall of the substrate. The thus formed layers extend from the end on the exhaust gas outflow side of the substrate along the direction opposite to the exhaust gas flow direction. After drying, the end on the exhaust gas outflow side of the substrate was dipped in the first slurry, and the first slurry was suctioned from the opposite side, followed by drying at 70° C. for 10 minutes. In this manner, layers (second catalyst layers before being subjected to calcination) each having a lower layer composed of the solids of the second slurry, and an upper layer composed of the solids of the first slurry, were formed, on the outflow-side cell side of the partition wall of the substrate. The thus formed layers extend from the end on the exhaust gas outflow side of the substrate along the direction opposite to the exhaust gas flow direction.

Thereafter, the substrate was calcined at 450° C. for one hour, to form the first catalyst layers and the second catalyst layers on the substrate. In this manner, an exhaust gas purification catalyst of Example 1 was obtained. Each of the first catalyst layers has a single-layer structure, and each of the second catalyst layers has a two-layer structure.

At the time of dipping the end on the exhaust gas inflow side of the substrate in the first slurry, the dipping conditions were adjusted such that the target value of the percentage of the length L1 of the first catalyst layers to the length L of the substrate was 45%, and the target value of WC1, which is the mass of the first catalyst layers per unit volume of the portion of the substrate provided with the first catalyst layers, was 55.6 g/L.

The measured value of the percentage of the length L1 of the first catalyst layers to the length L of the substrate was 43.3%.

The measured value of WC1 calculated based on the following equation was 57.2 g/L.

Measured value of $WC1$=((mass of substrate after forming first catalyst layers)–(mass of substrate before forming first catalyst layers))/((volume of substrate)×(measured value of percentage of length $L1$ of first catalyst layers to length $L$ of substrate))

The number of the first catalyst layers formed in the substrate is identical to the number of the inflow-side cells included in the substrate.

At the time of dipping the end on the exhaust gas outflow side of the substrate in the second slurry and the first slurry, the dipping conditions were adjusted such that the target value of the percentage of the length L2 of the second catalyst layers to the length L of the substrate was 70%, and the target value of WC2, which is the mass of the second catalyst layers per unit volume of the portion of the substrate provided with the second catalyst layers, was 50.0 g/L.

The measured value of the percentage of the length L2 of the second catalyst layers to the length L of the substrate was 72.4%.

The measured value of WC2 calculated based on the following equation was 48.0 g/L.

Measured value of $WC2$=((mass of substrate after forming second catalyst layers)–(mass of substrate before forming second catalyst layers))/((volume of substrate)×(measured value of percentage of length $L2$ of second catalyst layers to length $L$ of substrate))

The number of the second catalyst layers formed in the substrate is identical to the number of the outflow-side cells included in the substrate.

The exhaust gas purification catalyst of Example 1 was cut in a plane perpendicular to the axial direction of the substrate, the first and second catalyst layers present in the cross section were observed using a scanning electron microscope (SEM), and the forms of the first and second catalyst layers were identified. In the observation of the first catalyst layer, the exhaust gas purification catalyst was cut at a position 10 mm away from the end on the exhaust gas inflow side of the substrate in the axial direction of the substrate, and in the observation of the second catalyst layer, the exhaust gas purification catalyst was cut at a position 10 mm away from the end on the exhaust gas outflow side of the substrate in the axial direction of the substrate.

In the cross-sectional observation by SEM, the field magnification was set to 300 times, the total field width (the length in the direction perpendicular to the axial direction of the substrate) was set to 500 to 600 μm. Each region to be observed by SEM was selected so as not to include any of the corners of each cell.

The SEM observation images are shown in FIGS. 7 and 8. As shown in FIG. 7, it was possible to identify the region in which the partition wall of the substrate is present and the region in which the first catalyst layer is present, based on the difference in form between the first catalyst layer and the partition wall of the substrate. As shown in FIG. 8, it was also possible to identify the region in which the partition wall of the substrate is present and the region in which the second catalyst layer is present, based on the difference in form between the second catalyst layer and the partition wall of the substrate.

The first catalyst layer had a portion formed on the surface on the inflow-side cell side of the partition wall, and extending from the end on the exhaust gas inflow side of the partition wall along the exhaust gas flow direction. The surface of the partition wall on the side of the inflow-side cell is the outer surface thereof on the inflow-side cell side, which defines the external shape of the partition wall. The portion formed on the surface on the inflow-side cell side of the partition wall is a portion rising from the outer surface on the inflow-side cell side of the partition wall toward the inflow-side cell, and is hereinafter sometimes referred to as "the rising portion of the first catalyst layer".

The second catalyst layer had a portion formed on the surface on the outflow-side cell side of the partition wall, and extending from the end on the exhaust gas outflow side of the partition wall along the direction opposite to the exhaust gas flow direction. The surface on the outflow-side cell side of the partition wall is the outer surface thereof on the outflow-side cell side, which defines the external shape of the partition wall. The portion formed on the surface on the outflow-side cell side of the partition wall is a portion rising from the outer surface on the outflow-side cell side of the partition wall toward the outflow-side cell, and is hereinafter sometimes referred to as "the rising portion of the second catalyst layer".

As shown in FIG. 7, in the SEM observation image, the first to the 38-th grid lines perpendicular to the axial direction of the substrate were drawn at 15 μm intervals, sequentially from the left end side of the image, and the intersections of the outline of the region in which the partition wall of the substrate is present and the respective grid lines were connected with straight lines, to identify the position of the surface of the partition wall of the substrate. In the same manner, the intersections of the outline of the region in which the first catalyst layer is present and the respective grid lines were connected with straight lines, to identify the position of the surface of the first catalyst layer. In the case where the amount of change in the thickness direction from a certain intersection P1 to an intersection P2 adjacent to the intersection P1 exceeded the interval (15 μm) between two adjacent grid lines, the intersection P2 was not used in the identification of the position of the surfaces (namely, the intersection P2 was excluded from the intersections to be connected with straight lines). Further, in the case where the amount of change in the thickness direction from the intersection P1 to the intersection P2 adjacent to the intersection P1 exceeded the interval (15 μm) between two adjacent grid lines, and the amount of change in the thickness direction from the intersection P1 to an intersection P3 adjacent to the intersection P2 also exceeded the interval (15 μm) between two adjacent grid lines, the intersection P3 in addition to the intersection P2 were not used in the identification of the position of the surfaces (namely, the intersection P2 and the intersection P3 were excluded from the intersections to be connected with straight lines). When five successive intersections were excluded from the intersections to be connected with straight lines in such a manner, this SEM image was not used the measurement of the thickness.

After identifying the position of the surface of the partition wall of the substrate and the position of the surface of the first catalyst layer, the area of the region surrounded by the second grid line, the 37th grid line, the surface of the partition wall of the substrate and the surface of the first catalyst layer, was determined, using image analysis software. AreaQ (manufactured by S-Tech Corporation) was used as the image analysis software. The first grid line and the 38th grid line were not used, because the image is more likely to be unclear at both ends thereof, making it difficult to identify the position of the surface of the partition wall and the position of the surface of the first catalyst layer.

After determining the area of the above-described region, the thickness of the above-described region was calculated based on the following equation:

Thickness of the above-described region=area of the above-described region/(interval between grid lines×number of intervals between grid lines)

The interval between the grid lines is 15 μm, and the number of intervals between the grid lines is 35.

The thickness of the above-described region was calculated for 20 first catalyst layers arbitrarily selected from the cross section, and the mean value of the measured thicknesses was calculated to be 30.2 μm. The calculated mean value was defined as the thickness T1 of the rising portions of the first catalyst layers. The thickness T2 of the rising portions of the second catalyst layers was calculated in the same manner, to be 46.6 μm.

The characteristics of the exhaust gas purification catalyst of Example 1 are shown in Table 1.

(4) Evaluation of Exhaust Gas Purification Performance

The exhaust gas purification catalyst of the Example 1 was subjected to the following aging conditions comparable to driving 100,000 to 200,000 kilometers, as a degradation treatment.

<Aging Conditions>
Engine used for aging test: NA 2 L gasoline engine for passenger vehicle
Gasoline used: commercially available regular gasoline
Treatment temperature: 900° C.
Treatment time: 100 hours The exhaust gas purification catalyst of Example 1 was placed in an exhaust path of the engine, and an aging test was carried out under the conditions described above. The exhaust gas purification catalyst after the aging test was installed in a vehicle (a passenger car mounted with a 1.5 L direct injection turbo engine) and the vehicle was driven in accordance with the driving conditions of Worldwide Harmonized Light Vehicles Test Cycles (WLTC). The amount of emission of nitrogen oxide (NOx) in the exhaust gas which had passed through the exhaust gas purification catalyst was measured and the amount of emission (mg/km) per unit distance driven was determined, for each of the following periods: the period of low-speed operation from the start of driving to 589 seconds after the start of driving; the period of medium-speed operation from 589 seconds to 1022 seconds after the start of driving; the period of high-speed operation from 1022 seconds to 1477 seconds after the start of driving; and the period of ultra-high-speed operation from 1477 seconds to 1800 seconds after the start of driving. Fuel for authentication test was used as the gasoline, and an exhaust gas analyzer manufactured by HORIBA, Ltd. was used as the exhaust gas analyzer to be used. The results are shown in Table 2. Table 2 shows the amount of WLTC emission (Total amount of emission) per unit distance driven, and the amount of emission per unit distance driven during ultra-high-speed operation.

Example 2

An exhaust gas purification catalyst was produced in the same manner as in Example 1, except that the median diameter $D_{50}$ of the pore forming agent (cross-linked polymethyl (meth)acrylate particles) in the first slurry and the second slurry was changed to 5 μm.

The measured value of the percentage of the length L1 of the first catalyst layers to the length L of the substrate was 44.1%, and the measured value of the percentage of the length L2 of the second catalyst layers to the length L of the substrate was 68.2%.

The measured value of WC1 was 56.4 g/L, and the measured value of WC2 was 50.0 g/L.

The thickness T1 of the rising portions of the first catalyst layers was 25.3 μm, and the thickness T2 of the rising portions of the second catalyst layers was 40.9 μm.

The characteristics of the exhaust gas purification catalyst of Example 2 are shown in Table 1, and the exhaust gas purification performance of the exhaust gas purification catalyst of Example 2 evaluated in the same manner as in Example 1 is shown in Table 2.

Example 3

An exhaust gas purification catalyst was produced in the same manner as in Example 1, except that: the target value of the percentage of the length L1 of the first catalyst layers to the length L of the substrate was changed to 40%; the target value of WC1 was changed to 78.0 g/L; and the target value of WC2 was changed to 70 g/L.

The measured value of the percentage of the length L1 of the first catalyst layers to the length L of the substrate was 40.9%, and the measured value of the percentage of the length L2 of the second catalyst layers to the length L of the substrate was 71.2%.

The measured value of WC1 was 77.4 g/L, and the measured value of WC2 was 69.4 g/L.

The thickness T1 of the rising portions of the first catalyst layers was 38.2 μm, and the thickness T2 of the rising portions of the second catalyst layers was 75.6 μm.

The characteristics of the exhaust gas purification catalyst of Example 3 are shown in Table 1, and the exhaust gas purification performance of the exhaust gas purification catalyst of Example 3 evaluated in the same manner as in Example 1 is shown in Table 2.

Example 4

An exhaust gas purification catalyst was produced in the same manner as in Example 1, except that the target value of the percentage of the length L1 of the first catalyst layers to the length L of the substrate was changed to 35%, and that the target value of WC1 was changed to 71.4 g/L.

The measured value of the percentage of the length L1 of the first catalyst layers to the length L of the substrate was 32.0%, and the measured value of the percentage of the length L2 of the second catalyst layers to the length L of the substrate was 72.0%.

The measured value of WC1 was 78.1 g/L, and the measured value of WC2 was 48.6 g/L.

The thickness T1 of the rising portions of the first catalyst layers was 40.2 μm, and the thickness T2 of the rising portions of the second catalyst layers was 47.4 μm.

The characteristics of the exhaust gas purification catalyst of Example 4 are shown in Table 1, and the exhaust gas purification performance of the exhaust gas purification catalyst of Example 4 evaluated in the same manner as in Example 1 is shown in Table 2.

Example 5

An exhaust gas purification catalyst was produced in the same manner as in Example 1, except that the target value of the percentage of the length L2 of the second catalyst layers to the length L of the substrate was changed to 80%.

The measured value of the percentage of the length L1 of the first catalyst layers to the length L of the substrate was 42.5%, and the measured value of the percentage of the length L2 of the second catalyst layers to the length L of the substrate was 82.0%.

The measured value of WC1 was 59.9 g/L and the measured value of WC2 was 44.3 g/L.

The thickness T1 of the rising portions of the first catalyst layers was 31.6 μm, and the thickness T2 of the rising portions of the second catalyst layers was 39.0 μm.

The characteristics of the exhaust gas purification catalyst of Example 5 are shown in Table 1, and the exhaust gas purification performance of the exhaust gas purification catalyst of Example 5 evaluated in the same manner as in Example 1 is shown in Table 2.

Example 6

An exhaust gas purification catalyst was produced in the same manner as in Example 1, except that the target value of WC1 was set to 20% lower, and that the target value of WC2 was set to 20% lower.

The measured value of the percentage of the length L1 of the first catalyst layers to the length L of the substrate was 44.1%, and the measured value of the percentage of the length L2 of the second catalyst layers to the length L of the substrate was 69.3%.

The measured value of WC1 was 45.4 g/L and the measured value of WC2 was 40.4 g/L.

The thickness T1 of the rising portions of the first catalyst layers was 24.9 μm, and the thickness T2 of the rising portions of the second catalyst layers was 37.2 μm.

The characteristics of the exhaust gas purification catalyst of Example 6 are shown in Table 1, and the exhaust gas purification performance of the exhaust gas purification catalyst of Example 6 evaluated in the same manner as in Example 1 is shown in Table 2.

Example 7

An exhaust gas purification catalyst was produced in the same manner as in Example 1, except that the $D_{90}$ of the mixed powder (the mixture of the $CeO_2$—$ZrO_2$ solid solution powder and the alumina powder) in the first slurry was changed to 15 μm.

The measured value of the percentage of the length L1 of the first catalyst layers to the length L of the substrate was 45.7%, and the measured value of the percentage of the length L2 of the second catalyst layers to the length L of the substrate was 72.4%.

The measured value of WC1 was 54.5 g/L, and the measured value of WC2 was 49.7 g/L.

The thickness T1 of the rising portions of the first catalyst layers was 12.9 μm, and the thickness T2 of the rising portions of the second catalyst layers was 43.0 μm.

The characteristics of the exhaust gas purification catalyst of Example 7 are shown in Table 1, and the exhaust gas purification performance of the exhaust gas purification catalyst of Example 7 evaluated in the same manner as in Example 1 is shown in Table 2.

Example 8

An exhaust gas purification catalyst was produced in the same manner as in Example 1, except that the target value of WC1 was set to 60% higher, and that the target value of WC2 was set to 43% lower.

The measured value of the percentage of the length L1 of the first catalyst layers to the length L of the substrate was 46.5%, and the measured value of the percentage of the length L2 of the second catalyst layers to the length L of the substrate was 72.4%.

The measured value of WC1 was 86.9 g/L, and the measured value of WC2 was 28.6 g/L.

The thickness T1 of the rising portions of the first catalyst layers was 22.2 μm, and the thickness T2 of the rising portions of the second catalyst layers was 24.5 μm.

The characteristics of the exhaust gas purification catalyst of Example 8 are shown in Table 1, and the exhaust gas purification performance of the exhaust gas purification catalyst of Example 8 evaluated in the same manner as in Example 1 is shown in Table 2.

Comparative Example 1

An exhaust gas purification catalyst was produced in the same manner as in Example 1, except that the first catalyst layers of Comparative Example 1 were formed so that each of them has the same two-layer structure as the second catalyst layers of Example 1, and the second catalyst layers of Comparative Example 1 were formed so that each of them has the same single-layer structure as the first catalyst layers of Example 1.

The measured value of the percentage of the length L1 of the first catalyst layers to the length L of the substrate was 42.5%, and the measured value of the percentage of the length L2 of the second catalyst layers to the length L of the substrate was 69.3%.

The measured value of WC1 was 57.3 g/L, and the measured value of WC2 was 49.6 g/L The thickness T1 of the rising portions of the first catalyst layers was 52.8 µm, and the thickness T2 of the rising portions of the second catalyst layers was 25.7 µm.

The characteristics of the exhaust gas purification catalyst of Comparative Example 1 are shown in Table 1, and the exhaust gas purification performance of the exhaust gas purification catalyst of Comparative Example 1 evaluated in the same manner as in Example 1 is shown in Table 2.

Comparative Example 2

An exhaust gas purification catalyst was produced in the same manner as in Example 1, except that: the pore forming agent was not added to either of the first slurry and the second slurry; the first catalyst layers of Comparative Example 2 were formed using the second slurry of Example 1 so that each of them has a single-layer structure; the second catalyst layers of Comparative Example 2 were formed using the first slurry of Example 1 so that each of them has a single-layer structure; the target value of the percentage of the length L1 of the first catalyst layers to the length L of the substrate was changed to 40%; the target value of WC1 was changed to 62.5 g/L; and the target value of WC2 was changed to 64.3 g/L.

The measured value of the percentage of the length L1 of the first catalyst layers to the length L of the substrate was 42.2%, and the measured value of the percentage of the length L2 of the second catalyst layers to the length L of the substrate was 66.0%.

The measured value of WC1 was 66.7 g/L, and the measured value of WC2 was 68.2 g/L.

The thickness T1 of the rising portions of the first catalyst layers was 55.2 µm, and the thickness T2 of the rising portions of the second catalyst layers was 30.2 µm.

The characteristics of the exhaust gas purification catalyst of Comparative Example 2 are shown in Table 1, and the exhaust gas purification performance of the exhaust gas purification catalyst of Comparative Example 2 evaluated in the same manner as in Example 1 is shown in Table 2.

Comparative Example 3

An exhaust gas purification catalyst was produced in the same manner as in Example 1, except that the pore forming agent was not added to either of the first slurry and the second slurry.

The measured value of the percentage of the length L1 of the first catalyst layers to the length L of the substrate was 43.3%, and the measured value of the percentage of the length L2 of the second catalyst layers to the length L of the substrate was 71.3%.

The measured value of WC1 was 58.0 g/L, and the measured value of WC2 was 49.5 g/L.

The thickness T1 of the rising portions of the first catalyst layers was 39.8 µm, and the thickness T2 of the rising portions of the second catalyst layers was 39.8 µm.

The characteristics of the exhaust gas purification catalyst of Comparative Example 3 are shown in Table 1, and the exhaust gas purification performance of the exhaust gas purification catalyst of Comparative Example 3 evaluated in the same manner as in Example 1 is shown in Table 2.

Comparative Example 4

An exhaust gas purification catalyst was produced in the same manner as in Example 1, except that: the first catalyst layers of Comparative Example 4 were formed so that each of them has the same two-layer structure as the second catalyst layers of Example 1, and the second catalyst layers of Comparative Example 4 were formed so that each of them has the same single-layer structure as the first catalyst layers of Example 1; the target value of the percentage of the length L1 of the first catalyst layers to the length L of the substrate was changed to 70%; the target value of WC1 was changed to 64.3 g/L; the target value of the percentage of the length L2 of the second catalyst layers to the length L of the substrate was changed to 40%; and the target value of WC2 was changed to 62.5 g/L.

The measured value of the percentage of the length L1 of the first catalyst layers to the length L of the substrate was 71.2%, and the measured value of the percentage of the length L2 of the second catalyst layers to the length L of the substrate was 41.1%.

The measured value of WC1 was 65.2 g/L, and the measured value of WC2 was 61.3 g/L.

The thickness T1 of the rising portions of the first catalyst layers was 48.0 µm, and the thickness T2 of the rising portions of the second catalyst layers was 35.0 µm.

The characteristics of the exhaust gas purification catalyst of Comparative Example 4 are shown in Table 1, and the exhaust gas purification performance of the exhaust gas purification catalyst of Comparative Example 4 evaluated in the same manner as in Example 1 is shown in Table 2.

Comparative Example 5

An exhaust gas purification catalyst was produced in the same manner as in Example 1, except that the average particle size of the first slurry was reduced ($D_{90} \leq 0.5$ µm) and that the first catalyst layers of Comparative Example 5 were formed only inside the partition wall of the substrate. The $D_{90}$ is the particle size at which the cumulative volume reaches 90%, in a particle size distribution based on volume as measured by the laser diffraction scattering particle size distribution measurement method.

The measured value of the percentage of the length L1 of the first catalyst layers to the length L of the substrate was 44.5%, and the measured value of the percentage of the length L2 of the second catalyst layers to the length L of the substrate was 70.5%.

The measured value of WC1 was 56.2 g/L, and the measured value of WC2 was 49.6 g/L.

The first catalyst layers did not have a portion formed on the surface on the inflow-side cell side of the partition wall, and extending from the end on the exhaust gas inflow side of the partition wall along the exhaust gas flow direction (T1=0). The thickness T2 of the rising portions of the second catalyst layers was 45.2 µm.

The characteristics of the exhaust gas purification catalyst of Comparative Example 5 are shown in Table 1, and the exhaust gas purification performance of the exhaust gas purification catalyst of Comparative Example 5 evaluated in the same manner as in Example 1 is shown in Table 2.

Comparative Example 6

An exhaust gas purification catalyst was produced in the same manner as in Example 1, except that the average particle sizes of the first slurry and the second slurry were reduced ($D_{90} \leq 0.5$ μm), and that the first catalyst layers and the second catalyst layers of Comparative Example 6 were formed only inside the partition wall of the substrate.

The measured value of the percentage of the length L1 of the first catalyst layers to the length L of the substrate was 46.1%, and the measured value of the percentage of the length L2 of the second catalyst layers to the length L of the substrate was 72.1%.

The measured value of WC1 was 54.2 g/L, and the measured value of WC2 was 48.5 g/L.

The first catalyst layers did not have a portion formed on the surface on the inflow-side cell side of the partition wall, and extending from the end on the exhaust gas inflow side of the partition wall along the exhaust gas flow direction (T1=0). The second catalyst layers did not have a portion formed on the surface on the outflow-side cell side of the partition wall, and extending from the end on the exhaust gas outflow side of the partition wall along the direction opposite to the exhaust gas flow direction (T2=0).

The characteristics of the exhaust gas purification catalyst of Comparative Example 6 are shown in Table 1, and the exhaust gas purification performance of the exhaust gas purification catalyst of Comparative Example 6 evaluated in the same manner as in Example 1 is shown in Table 2.

TABLE 1

|  | L1/L (%) | L2/L (%) | L2/L1 |
|---|---|---|---|
| Example 1 | 43.3 | 72.4 | 1.67 |
| Example 2 | 44.1 | 68.2 | 1.55 |
| Example 3 | 40.9 | 71.2 | 1.74 |
| Example 4 | 32.0 | 72.0 | 2.25 |
| Example 5 | 42.5 | 82.0 | 1.93 |
| Example 6 | 44.1 | 69.3 | 1.57 |
| Example 7 | 45.7 | 72.4 | 1.58 |
| Example 8 | 46.5 | 72.4 | 1.56 |
| Comparative Example 1 | 42.5 | 69.3 | 1.63 |
| Comparative Example 2 | 42.2 | 66.0 | 1.56 |
| Comparative Example 3 | 43.3 | 71.3 | 1.65 |
| Comparative Example 4 | 71.2 | 41.1 | 0.58 |
| Comparative Example 5 | 44.5 | 70.5 | 1.58 |
| Comparative Example 6 | 46.1 | 72.1 | 1.56 |

|  | WC1 (g/L) | WC2 (g/L) | Presence or absence of rising portions | | WC1/WC2 |
|---|---|---|---|---|---|
|  |  |  | First catalyst layers | Second catalyst layers |  |
| Example 1 | 57.2 | 48.0 | Present | Present | 1.19 |
| Example 2 | 56.4 | 50.0 | Present | Present | 1.13 |
| Example 3 | 77.4 | 69.4 | Present | Present | 1.12 |
| Example 4 | 78.1 | 48.6 | Present | Present | 1.61 |
| Example 5 | 59.9 | 44.3 | Present | Present | 1.35 |
| Example 6 | 45.4 | 40.4 | Present | Present | 1.12 |
| Example 7 | 54.5 | 49.7 | Present | Present | 1.10 |
| Example 8 | 86.9 | 28.6 | Present | Present | 3.03 |
| Comparative Example 1 | 57.3 | 49.6 | Present | Present | 1.16 |
| Comparative Example 2 | 66.7 | 68.2 | Present | Present | 0.98 |
| Comparative Example 3 | 58.0 | 49.5 | Present | Present | 1.17 |
| Comparative Example 4 | 65.2 | 61.3 | Present | Present | 1.06 |
| Comparative Example 5 | 56.2 | 49.6 | Absent | Present | 1.13 |
| Comparative Example 6 | 54.2 | 48.5 | Absent | Absent | 1.12 |

|  | T1 (μm) | T2 (μm) | T2/T1 |
|---|---|---|---|
| Example 1 | 30.2 | 46.6 | 1.54 |
| Example 2 | 25.3 | 40.9 | 1.62 |
| Example 3 | 38.2 | 75.6 | 1.98 |
| Example 4 | 40.2 | 47.4 | 1.18 |
| Example 5 | 31.6 | 39.0 | 1.23 |
| Example 6 | 24.9 | 37.2 | 1.49 |
| Example 7 | 12.9 | 43.0 | 3.33 |
| Example 8 | 22.2 | 24.5 | 1.10 |
| Comparative Example 1 | 52.8 | 25.7 | 0.49 |
| Comparative Example 2 | 55.2 | 30.2 | 0.55 |
| Comparative Example 3 | 39.8 | 39.8 | 1.00 |
| Comparative Example 4 | 48.0 | 35.0 | 0.73 |
| Comparative Example 5 | — | 45.2 | — |
| Comparative Example 6 | — | — | — |

TABLE 2

|  | Amount of emission of NOx per unit distance driven (mg/km) | |
|---|---|---|
|  | Total | During ultra-high-speed operation |
| Example 1 | 5.7 | 0.50 |
| Example 2 | 5.6 | 0.55 |
| Example 3 | 5.5 | 0.55 |
| Example 4 | 6.2 | 0.53 |
| Example 5 | 6.4 | 0.59 |
| Example 6 | 5.5 | 0.63 |
| Example 7 | 5.9 | 0.57 |
| Example 8 | 6.0 | 0.66 |
| Comparative Example 1 | 7.0 | 1.02 |
| Comparative Example 2 | 9.5 | 1.59 |
| Comparative Example 3 | 7.5 | 1.05 |
| Comparative Example 4 | 7.4 | 1.21 |
| Comparative Example 5 | 12.2 | 1.65 |
| Comparative Example 6 | 9.3 | 1.14 |

As shown in Tables 1 and 2, the amount of NOx emission (particularly, the amount of NOx emission during ultra-high-speed operation) was significantly decreased in the exhaust gas purification catalysts of Examples 1 to 8 that satisfy all of the expressions (1) to (3) described above, as compared to the exhaust gas purification catalysts of Comparative Example 1 to 6 that do not satisfy one or more of the expressions (1) to (3) described above. These results have confirmed that an improved exhaust gas purification performance (particularly, exhaust gas purification performance during ultra-high-speed operation) can be obtained by satisfying all of the expressions (1) to (3) described above.

REFERENCE SIGNS LIST 10 exhaust gas purification catalyst
20 substrate
21 tubular member
22 partition wall
24 first sealing member
25 second sealing member
C1 inflow-side cell
C2 outflow-side cell
30 first catalyst layer
40 second catalyst layer

The invention claimed is:

1. An exhaust gas purification catalyst extending in an exhaust gas flow direction, the exhaust gas purification catalyst comprising:
a substrate;
first catalyst layers provided in the substrate; and
second catalyst layers provided in the substrate;
wherein the substrate comprises:
inflow-side cells each extending in the exhaust gas flow direction and having an open end on an exhaust gas inflow side thereof and a closed end on an exhaust gas outflow side thereof;
outflow-side cells each extending in the exhaust gas flow direction and having a closed end on an exhaust gas inflow side thereof and an open end on an exhaust gas outflow side thereof; and
a porous partition wall separating the inflow-side cells and the outflow-side cells from one another,
wherein the first catalyst layers each have a portion that is formed on a surface on an inflow-side cell side of the partition wall, and extends from an end on an exhaust gas inflow side of the partition wall along the exhaust gas flow direction,
wherein the second catalyst layers each have a portion that is formed on a surface on an outflow-side cell side of the partition wall, and extends from an end on an exhaust gas outflow side of the partition wall along a direction opposite to the exhaust gas flow direction, and
wherein the first catalyst layers and the second catalyst layers satisfy the following expressions (1) to (6):

$1.1 \leq L2/L1 \leq 2.2$ $1.1 \leq T2/T1 \leq 3.0$ $1.05 \leq WC1/WC2 \leq 2.5$ $1 \leq (L1+L2)/L \leq 1.5$ $12.9 \ \mu m \leq T1 \leq 55 \ \mu m$ $20 \ \mu m \leq T2 \leq 100 \ \mu m$ wherein
L represents a length of the substrate,
L1 represents a length of the first catalyst layers,
L2 represents a length of the second catalyst layers,
T1 represents a thickness of the portions of the first catalyst layers,
T2 represents a thickness of the portions of the second catalyst layers,
WC1 represents a mass of the first catalyst layers per unit volume of a portion of the substrate provided with the first catalyst layers, and
WC2 represents a mass of the second catalyst layers per unit volume of a portion of the substrate provided with the second catalyst layers.

2. The exhaust gas purification catalyst according to claim 1, wherein the first catalyst layers and the second catalyst layers each contain at least one catalytically-active component independently selected from the group consisting of platinum (Pt), palladium (Pd), rhodium (Rh), ruthenium (Ru), iridium (Ir) and osmium (Os).

3. The exhaust gas purification catalyst according to claim 1, wherein the first catalyst layers and the second catalyst layers further satisfy the following expressions:

$50 \ g/L \leq WC1 \leq 90 \ g/L$ $40 \ g/L \leq WC2 \leq 90 \ g/L$.

4. The exhaust gas purification catalyst according to claim 1, wherein the first catalyst layers and the second catalyst layers further satisfy the following expression:

$40 \ g/L \leq WC2 \leq 90 \ g/L$.

5. The exhaust gas purification catalyst according to claim 1, wherein the first catalyst layers and the second catalyst layers further satisfy the following expression:

$50 \ g/L \leq WC1 \leq 90 \ g/L$.

* * * * *